(12) United States Patent
Ohara et al.

(10) Patent No.: US 11,445,551 B2
(45) Date of Patent: Sep. 13, 2022

(54) BASE STATION APPARATUS AND USER APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 121 days.

(21) Appl. No.: 16/644,449

(22) PCT Filed: Sep. 8, 2017

(86) PCT No.: PCT/JP2017/032594
§ 371 (c)(1),
(2) Date: Mar. 4, 2020

(87) PCT Pub. No.: WO2019/049352
PCT Pub. Date: Mar. 14, 2019

(65) Prior Publication Data
US 2020/0229236 A1    Jul. 16, 2020

(51) Int. Cl.
*H04W 72/00* (2009.01)
*H04W 74/08* (2009.01)
(Continued)

(52) U.S. Cl.
CPC ....... *H04W 74/0833* (2013.01); *H04L 5/0094* (2013.01); *H04W 72/005* (2013.01); *H04W 72/0446* (2013.01)

(58) Field of Classification Search
CPC ........... H04W 74/0833; H04W 72/005; H04W 72/0446; H04W 48/12; H04L 5/0094;
(Continued)

(56) References Cited

U.S. PATENT DOCUMENTS

2014/0362701 A1* 12/2014 Roh .................. H03M 13/2966
370/235
2016/0295609 A1* 10/2016 Vajapeyam ......... H04W 72/042
(Continued)

FOREIGN PATENT DOCUMENTS

EP    2 947 938 A1    11/2015

OTHER PUBLICATIONS

LG Electronics; "On four-step RACH Procedure"; 3GPP TSG RAN WG1 Meeting #90, R1-1713131; Prague, Czech Republic; Aug. 21-25, 2017 (6 pages) (Year: 2017).*
(Continued)

*Primary Examiner* — Lan-Huong Truong
(74) *Attorney, Agent, or Firm* — Osha Bergman Watanabe & Burton LLP

(57) ABSTRACT

A base station apparatus that communicates with a user apparatus is provided. The base station apparatus includes: a setting unit configured to arrange in a radio frame one or more blocks and information, the one or more blocks including information used for initial access, the information specifying resources that are associated with the blocks and are used for transmitting preambles; a transmission unit configured to transmit the radio frame to the user apparatus; and a reception unit configured to receive the preambles from the user apparatus via the resources. The information specifying the resource is set based on locations of the blocks arranged in the radio frame.

20 Claims, 21 Drawing Sheets

(51) Int. Cl.
*H04L 5/00* (2006.01)
*H04W 72/04* (2009.01)

(58) Field of Classification Search
CPC ... H04L 5/0053; H04L 5/0092; H04L 5/0078; H04L 5/0007
See application file for complete search history.

(56) References Cited

U.S. PATENT DOCUMENTS

| | | | |
|---|---|---|---|
| 2017/0202028 A1* | 7/2017 | Gaal | H04B 1/713 |
| 2018/0054800 A1* | 2/2018 | Yeo | H04W 72/08 |
| 2018/0167979 A1* | 6/2018 | Guo | H04W 74/0833 |
| 2018/0368181 A1* | 12/2018 | Lee | H04W 24/08 |
| 2019/0053314 A1* | 2/2019 | Zhou | H04L 27/2611 |

OTHER PUBLICATIONS

Samsung; "Discussion on RACH design"; 3GPP TSG RAN WG1 Meeting #90, R1-1713570; Prague, Czechia; Aug. 21-25, 2017 (3 pages) (Year: 2017).*
International Search Report issued in PCT/JP2017/032594 dated Oct. 31, 2017 (3 pages).
Written Opinion of the International Searching Authority issued in PCT/JP2017/032594 dated Oct. 31, 2017 (3 pages).
Samsung; "Discussion on RACH design"; 3GPP TSG RAN WG1 Meeting #90, R1-1713570; Prague, Czechia; Aug. 21-25, 2017 (3 pages).
NTT DOCOMO, Inc.; "Discussion on PRACH preamble format details for long/short sequence length for NR"; 3GPP TSG RAN WG1 Ad-Hoc#2, R1-1711065; Qingdao, P.R. China; Jun. 27-30, 2017 (6 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
Extended European Search Report issued in European Application No. 17924567.5, dated Jan. 27, 2021 (8 pages).
Office Action issued in the counterpart Japanese Patent Application No. 2019-540272, dated Apr. 13, 2021 (12 pages).
LG Electronics; "On four-step RACH Procedure"; 3GPP TSG RAN WG1 Meeting #90, R1-1713131; Prague, Czech Republic; Aug. 21-25, 2017 (6 pages).
Office Action in counterpart Indian Patent Application No. 202037016166 dated Sep. 6, 2021 (6 pages).

* cited by examiner

FIG.6
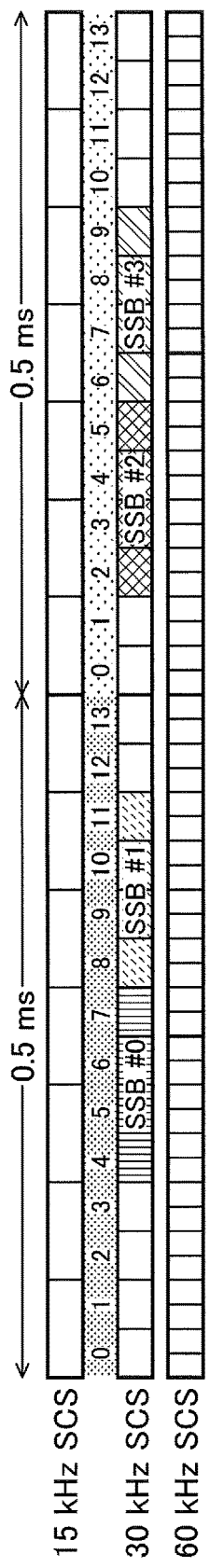
A) SLOT CONFIGURATION EXAMPLE 1 WHEN SS block SUB-CARRIER SPACING IS 30 kHz
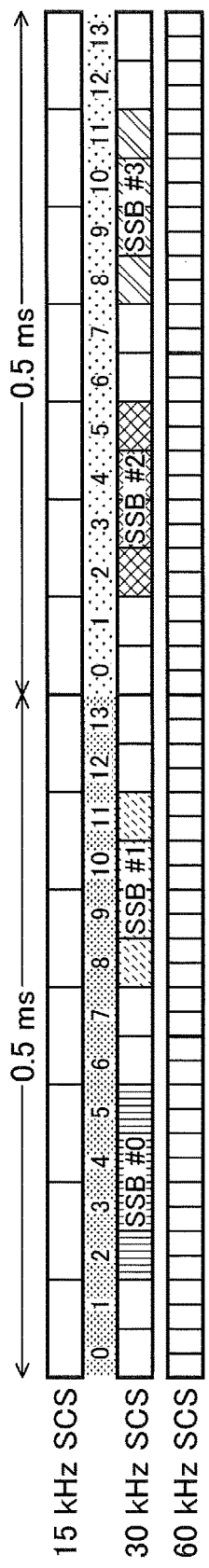
B) SLOT CONFIGURATION EXAMPLE 2 WHEN SS block SUB-CARRIER SPACING IS 30 kHz
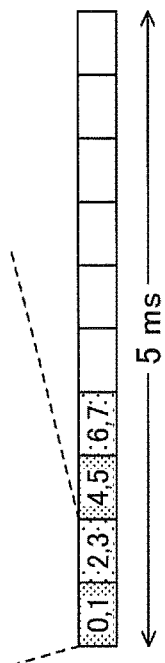
D) IN THE CASE WHERE FREQUENCY BAND IS BETWEEN 3 GHz AND 6 GHz
C) IN THE CASE WHERE FREQUENCY BAND IS BETWEEN 0 Hz AND 3 GHz FIG.7
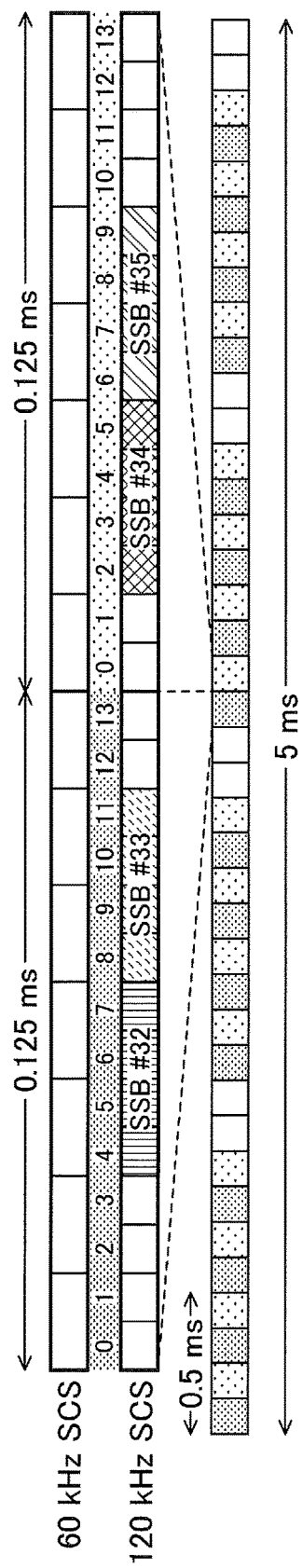
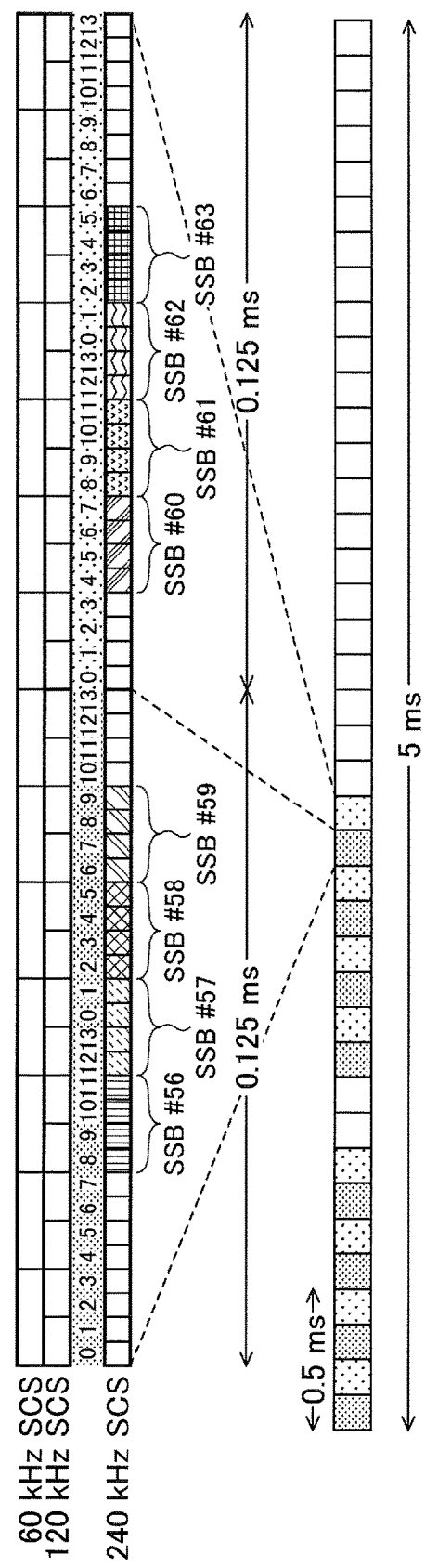

FIG.9
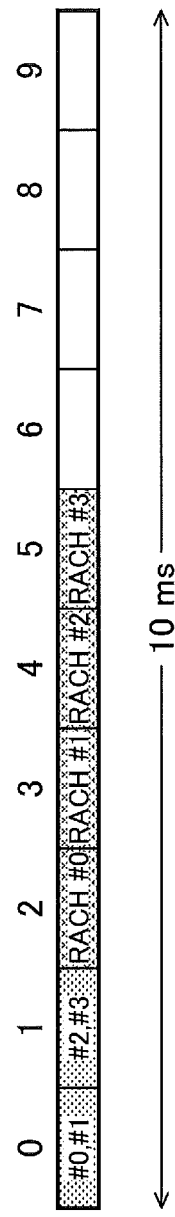
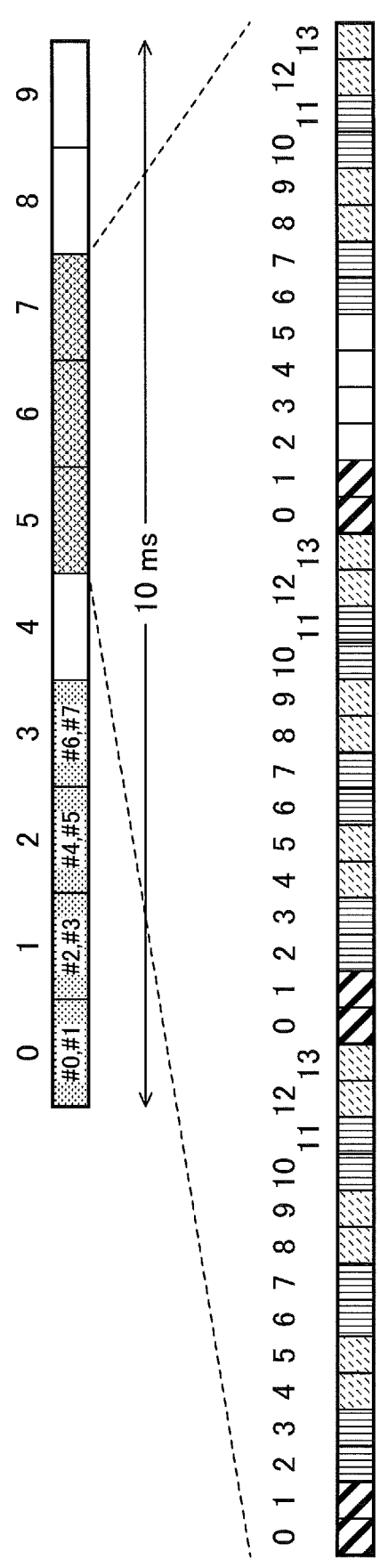

FIG.10
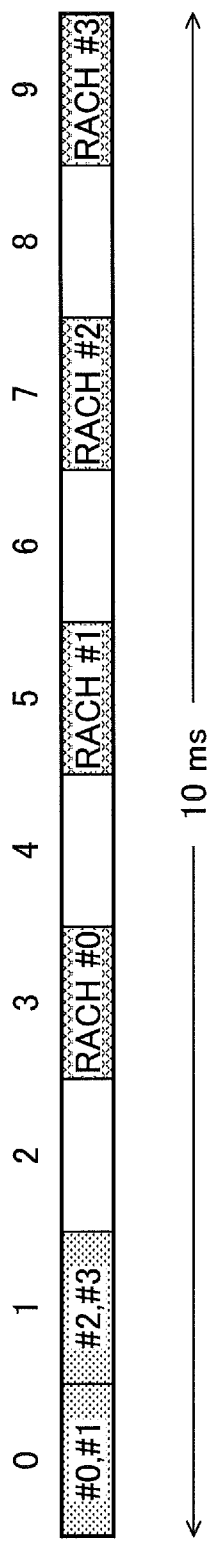
A) IN THE CASE WHERE SS block FREQUENCY BAND IS BETWEEN 0 Hz AND 3 GHz
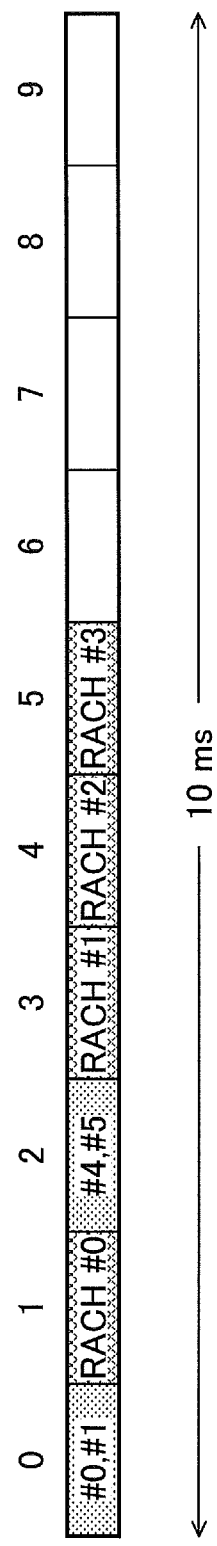
B) IN THE CASE WHERE SS block FREQUENCY BAND IS BETWEEN 3 GHz AND 6 GHz

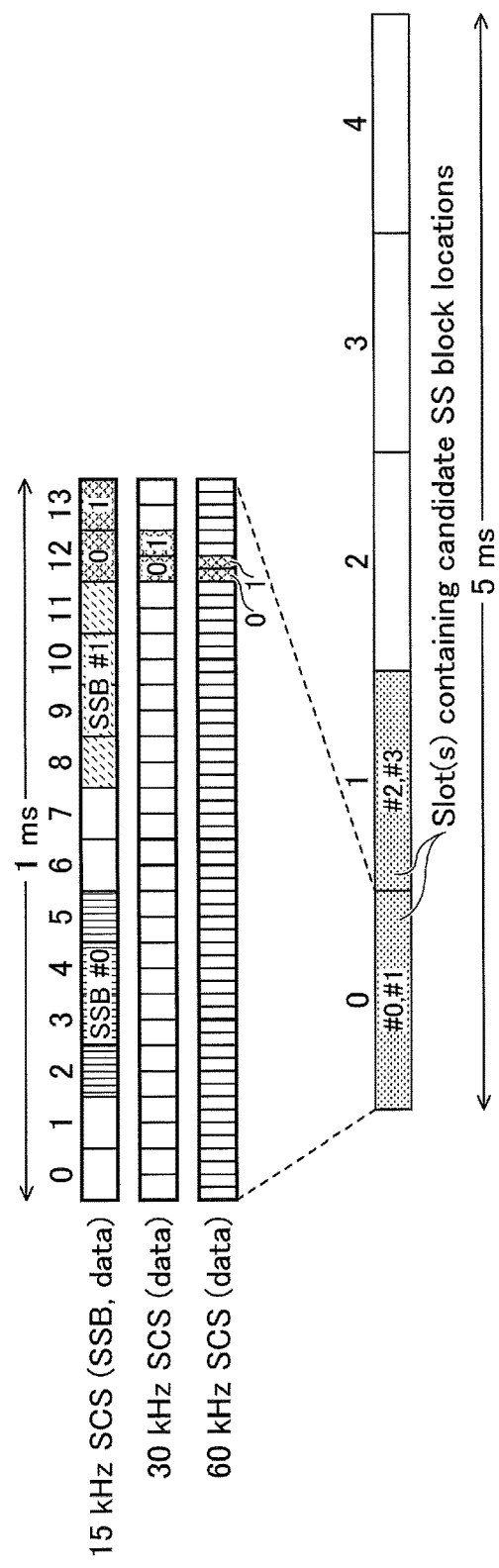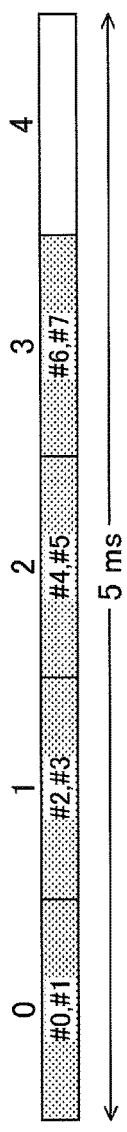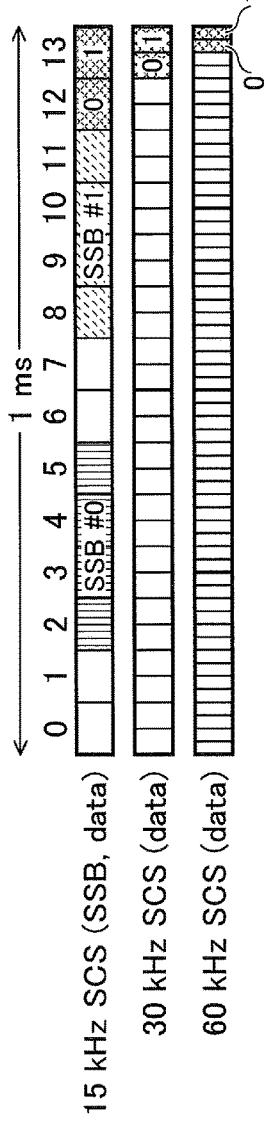
FIG.13

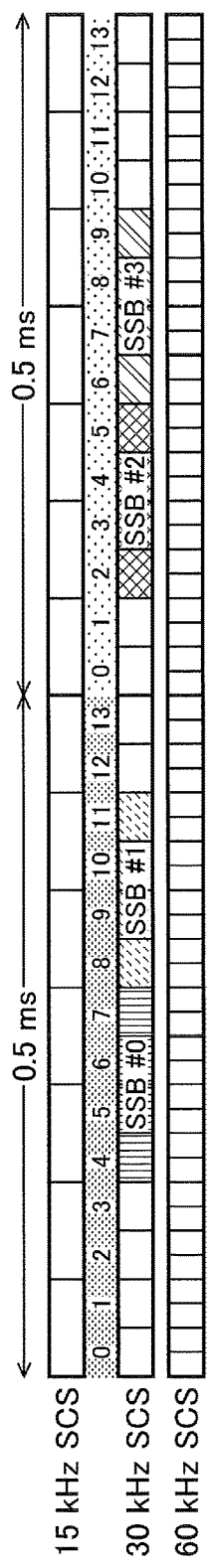
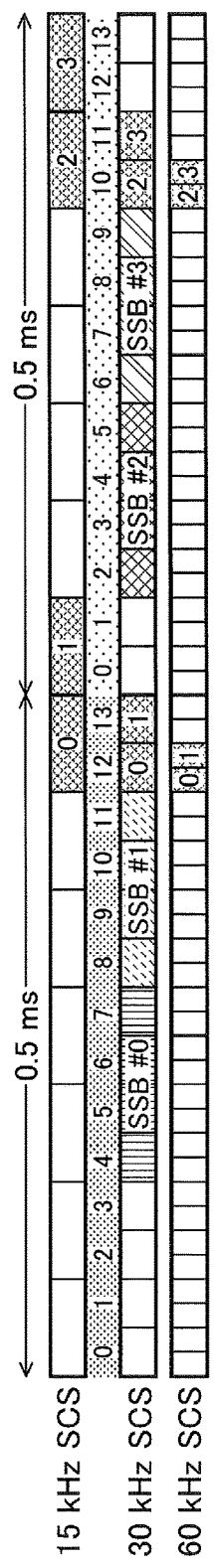
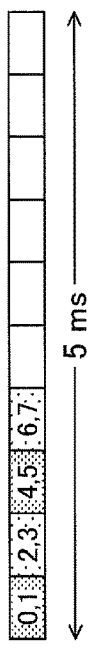
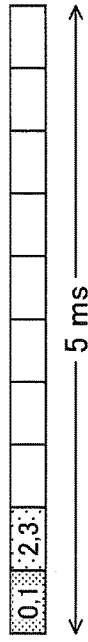
FIG.14

FIG.15
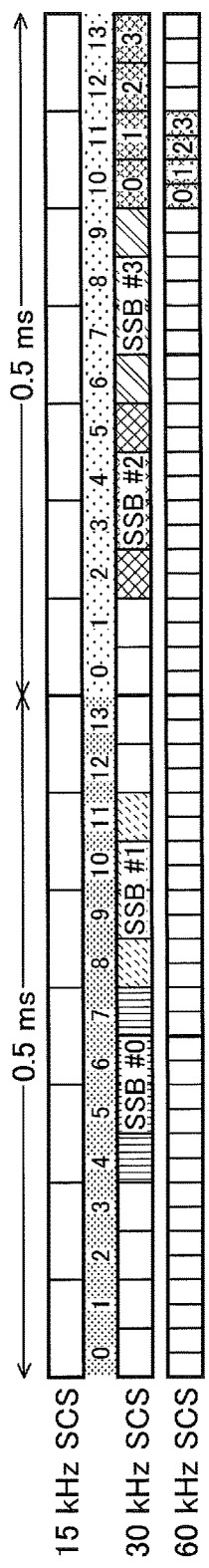
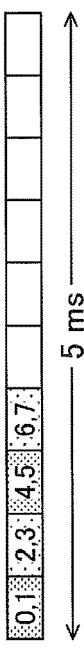
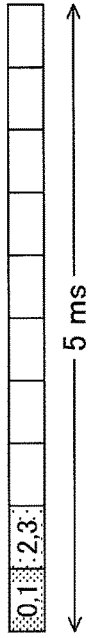
A) SS block SLOT CONFIGURATION EXAMPLE 1
B) IN THE CASE WHERE FREQUENCY BAND IS BETWEEN 0 Hz AND 3 GHz
C) IN THE CASE WHERE FREQUENCY BAND IS BETWEEN 3 GHz AND 6 GHz
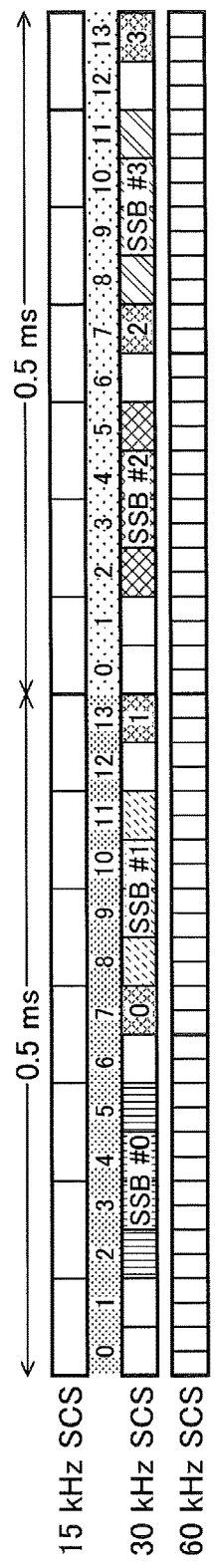
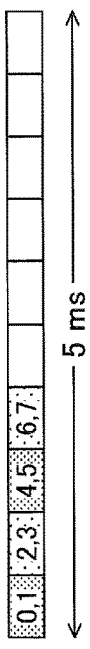
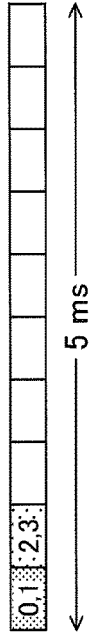
D) SS block SLOT CONFIGURATION EXAMPLE 2
E) IN THE CASE WHERE FREQUENCY BAND IS BETWEEN 0 Hz AND 3 GHz
F) IN THE CASE WHERE FREQUENCY BAND IS BETWEEN 3 GHz AND 6 GHz FIG.16
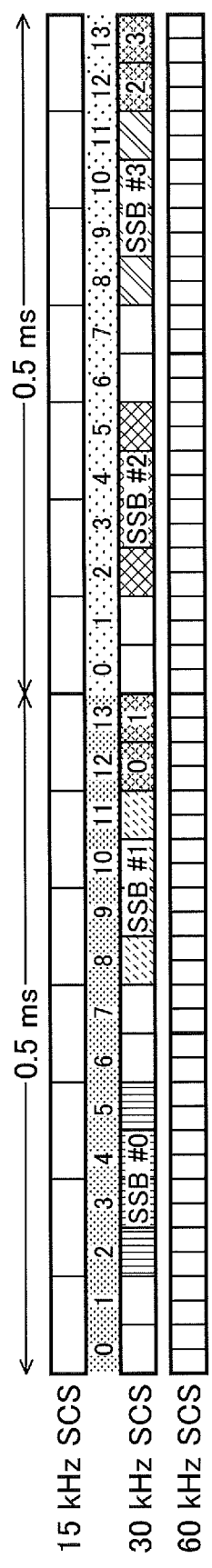
A) SS block SLOT CONFIGURATION EXAMPLE 2
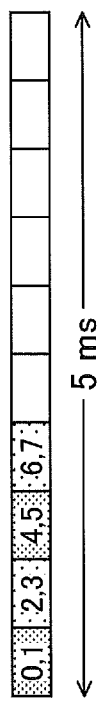
C) IN THE CASE WHERE FREQUENCY BAND IS BETWEEN 3 GHz AND 6 GHz
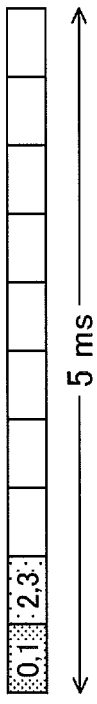
B) IN THE CASE WHERE FREQUENCY BAND IS BETWEEN 0 Hz AND 3 GHz FIG.17
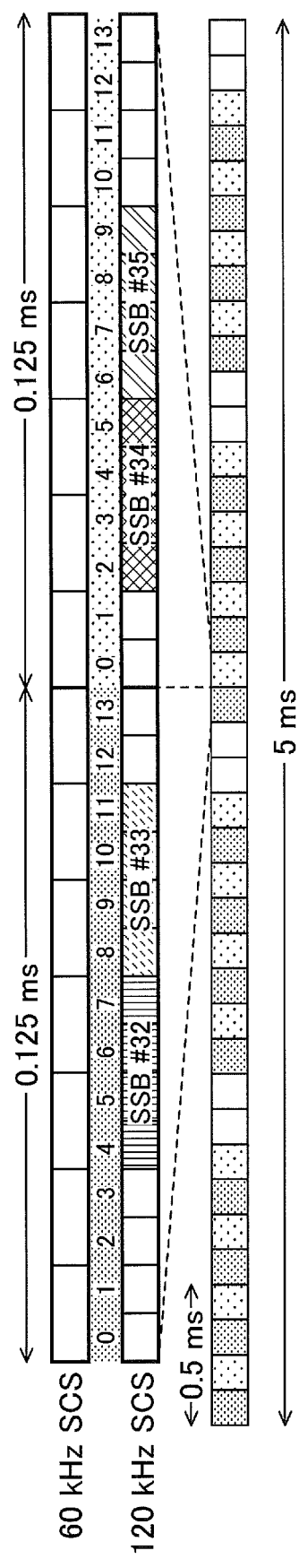
A) IN THE CASE WHERE SS block FREQUENCY BAND IS BETWEEN 6 GHz AND 52.6 GHz
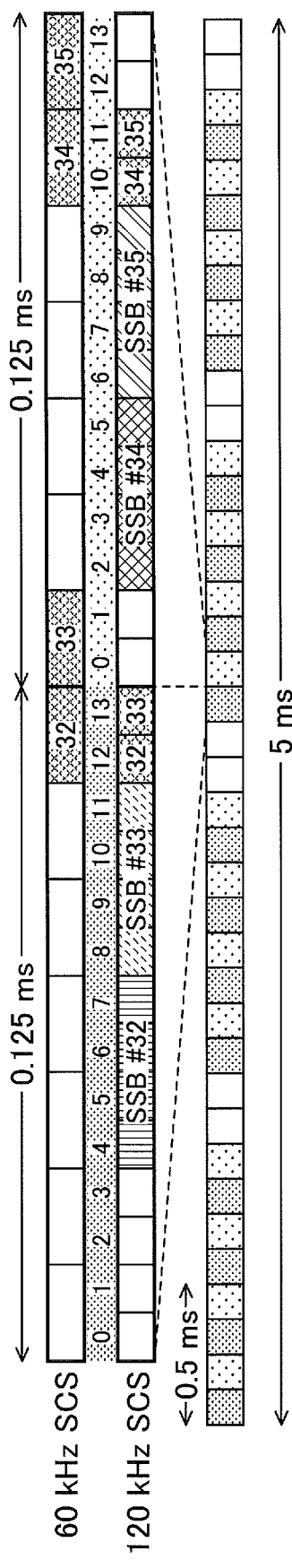
B) IN THE CASE WHERE SS block FREQUENCY BAND IS BETWEEN 6 GHz AND 52.6 GHz

FIG.18
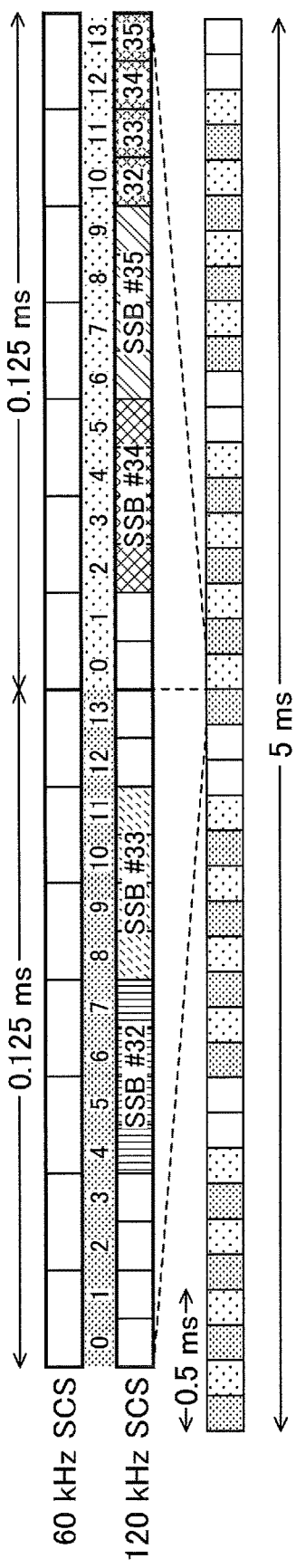
A) IN THE CASE WHERE SS block FREQUENCY BAND IS BETWEEN 6 GHz AND 52.6 GHz
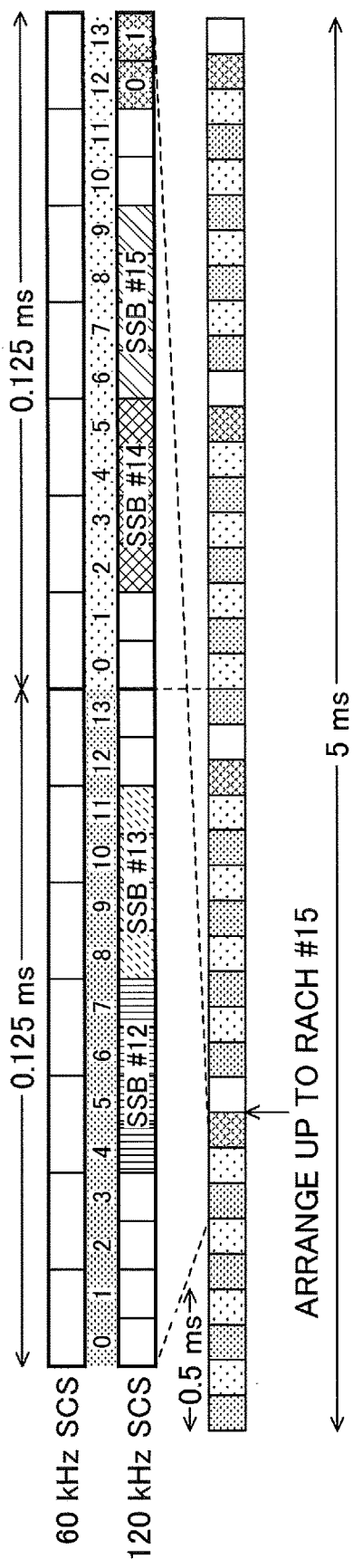
B) IN THE CASE WHERE SS block FREQUENCY BAND IS BETWEEN 6 GHz AND 52.6 GHz

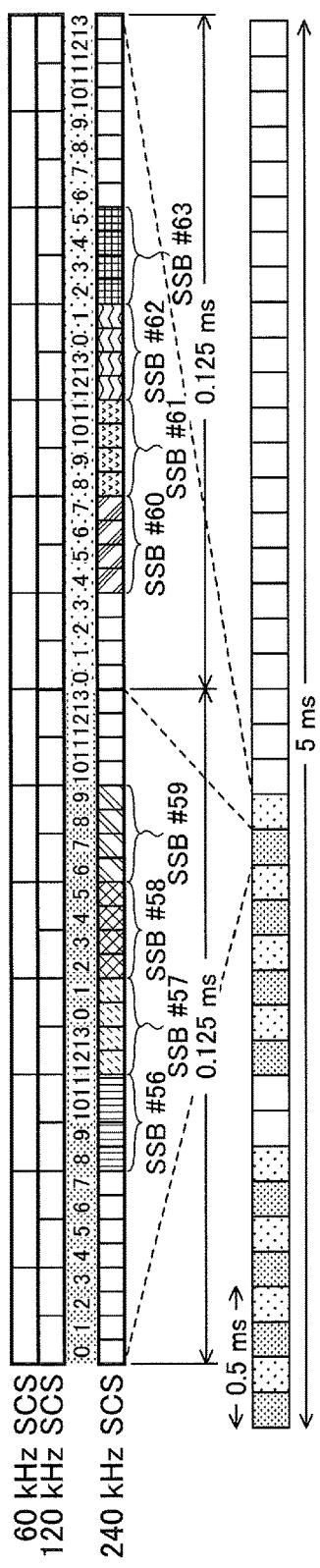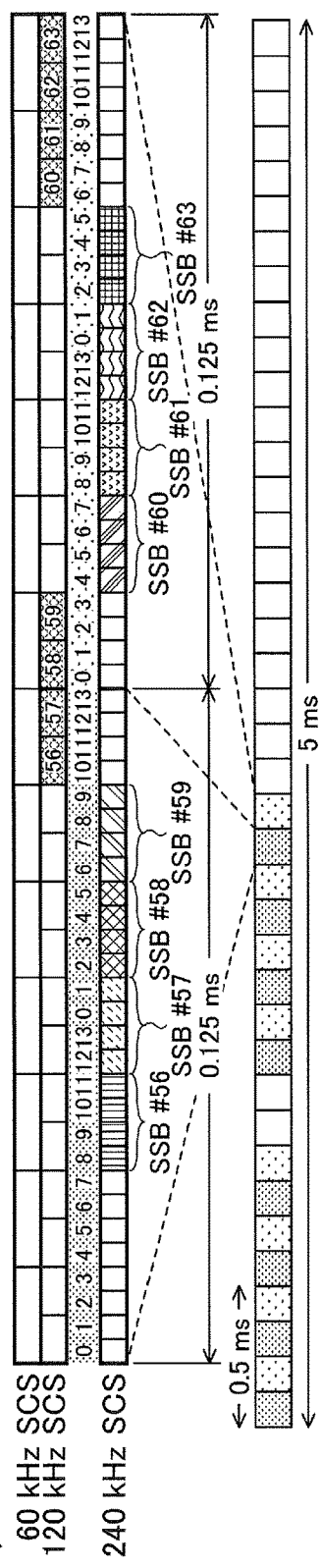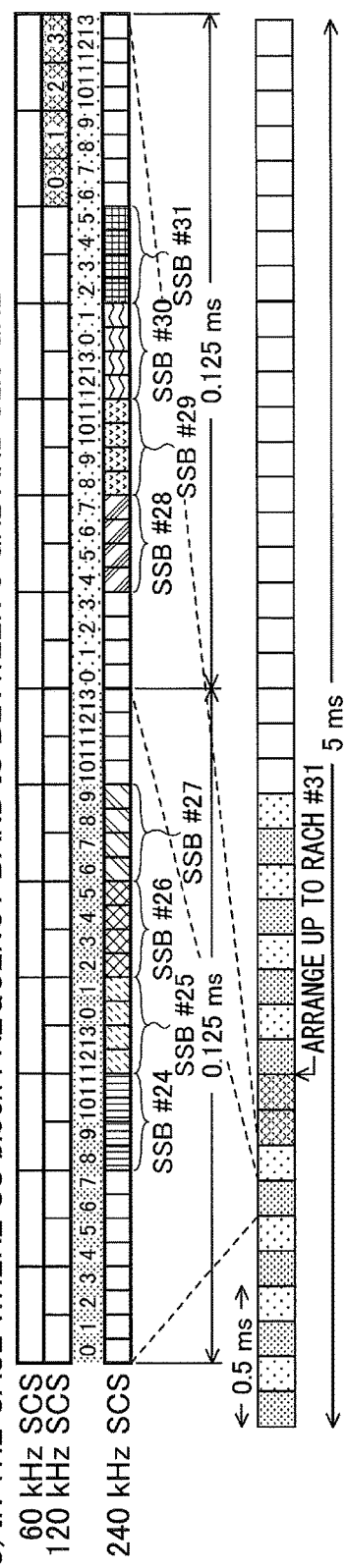
FIG.19

BASE STATION APPARATUS AND USER APPARATUS

BACKGROUND OF THE INVENTION

1. Field of the Invention

The present invention relates to a base station apparatus and a user apparatus in a wireless communication system.

2. Description of the Related Art

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In NR, various wireless technologies have been discussed in order to meet requirements including latency equal to or less than 1 ms in a wireless section while realizing a throughput equal to or greater than 10 Gbps.

In NR, in initial access in which a user apparatus establishes a connection between the user apparatus and a base station apparatus, the user apparatus detects a cell according to a synchronization signal transmitted from the base station apparatus, identifies the cell, and obtains a part of system information necessary for the initial access (e.g., Non-Patent Document 1).

Further, in NR, it is expected that a wide range of frequencies, from a low frequency band similar to LTE (Long Term Evolution) to a frequency band that is higher than LTE, will be used. Propagation loss increases especially in a high frequency band. Therefore, in order to compensate for the propagation loss, an application of beamforming with a narrow beam width has been discussed (e.g., Non-Patent Document 2).

CITATION LIST

Non-Patent Document

[Non-Patent Document 1] 3GPP TS36.213 V14.3.0 (2017-06)

[Non-Patent Document 2] 3GPP TS36.211 V14.3.0 (2017-06)

SUMMARY OF THE INVENTION

Technical Problem

In NR, a synchronization signal and a part of system information, that are necessary for the initial access, are mapped to a radio frame by using a resource unit called "SS block" that consists of consecutive (successive) OFDM (Orthogonal Frequency Division Multiplexing) symbols. A user apparatus obtains information necessary for the initial access by receiving the SS block transmitted from a base station apparatus. The information necessary for the initial access includes information that specifies a RACH (Random Access Channel) resource and a preamble signal format.

Further, in NR, the base station apparatus transmits multiple beams by applying the beamforming. The user apparatus receives SS blocks that are associated with the beams and obtains information necessary for the initial access.

Here, it is necessary to appropriately define locations in a radio frame, in which RACH resources associated with the received SS blocks are arranged.

The present invention has been made in view of the above. It is an object of the present invention to appropriately arrange a resource, that is used for random access, in a radio frame in the initial access of the wireless communication system.

Solution to Problem

According to an embodiment of the present invention, a base station apparatus that communicates with a user apparatus is provided. The base station apparatus includes: a setting unit configured to arrange in a radio frame one or more blocks including information to be used for initial access and information specifying a resource, that is associated with the blocks, used for transmitting a preamble; a transmission unit configured to transmit the radio frame to the user apparatus; and a reception unit configured to receive the preamble from the user apparatus via the resource. The information specifying the resource is set based on the locations of the blocks arranged in the radio frame.

Advantageous Effects of Invention

According to an embodiment of the present invention, it is possible to appropriately arrange a resource, that is used for random access, in a radio frame in the initial access of the wireless communication system.

BRIEF DESCRIPTION OF THE DRAWINGS

FIG. 6 is a drawing illustrating a configuration example (2) of an SS burst set according to an embodiment of the present invention.

FIG. 7 is a drawing illustrating a configuration example (3) of an SS burst set according to an embodiment of the present invention.

FIG. 9 is a drawing illustrating a RACH resource arrangement example (1) in the case where an SS block subcarrier spacing is 15 kHz according to an embodiment of the present invention.

FIG. 10 is a drawing illustrating a RACH resource arrangement example (2) in the case where an SS block subcarrier spacing is 15 kHz according to an embodiment of the present invention.

FIG. 13 is a drawing illustrating a RACH resource arrangement example (5) in the case where an SS block subcarrier spacing is 15 kHz according to an embodiment of the present invention.

FIG. 14 is a drawing illustrating a RACH resource arrangement example (1) in the case where an SS block subcarrier spacing is 30 kHz according to an embodiment of the present invention.

FIG. 15 is a drawing illustrating a RACH resource arrangement example (2) in the case where an SS block subcarrier spacing is 30 kHz according to an embodiment of the present invention.

FIG. 16 is a drawing illustrating a RACH resource arrangement example (3) in the case where an SS block subcarrier spacing is 30 kHz according to an embodiment of the present invention.

FIG. 17 is a drawing illustrating a RACH resource arrangement example (1) in the case where an SS block subcarrier spacing is 120 kHz according to an embodiment of the present invention.

FIG. 18 is a drawing illustrating a RACH resource arrangement example (2) in the case where an SS block subcarrier spacing is 120 kHz according to an embodiment of the present invention.

FIG. 19 is a drawing illustrating a RACH resource arrangement example (1) in the case where an SS block subcarrier spacing is 240 kHz according to an embodiment of the present invention.

DETAILED DESCRIPTION OF THE PREFERRED EMBODIMENTS

Figure 1:
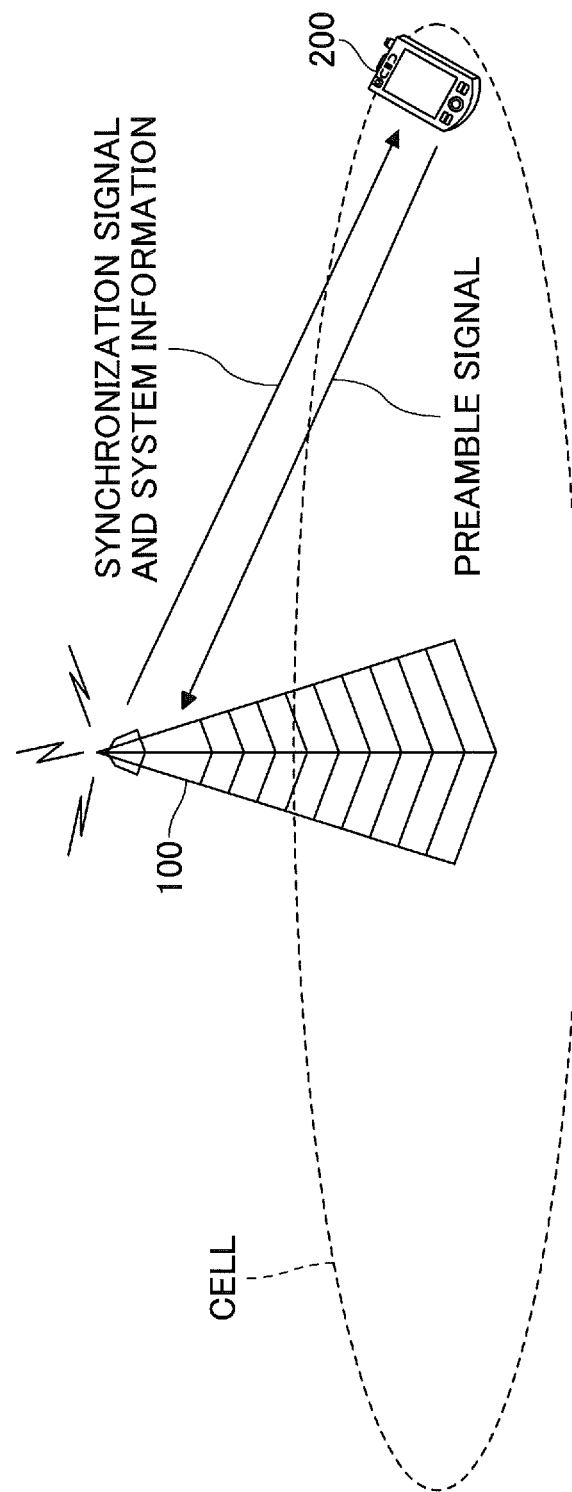
FIG. 1 is a drawing illustrating a configuration example of a wireless communication system according to an embodiment of the present invention.

In the following, referring to the drawings, an embodiment of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to the above, may be referred to by different terms. Further, the above-described terms used in NR will be referred to as "NR-SS", "NR-PSS", "NR-SSS", "NR-PBCH", "NR-PRACH", etc.

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, a single base station apparatus 100 and a single user apparatus 200 are illustrated as examples. There may be a plurality of the base station apparatuses 100 and a plurality of the user apparatuses 200.

The base station apparatus 100 is a communication apparatus that provides one or more cells and performs wireless communications with the user apparatus 200. As illustrated in FIG. 1, the base station apparatus 100 transmits a synchronization signal and system information to the user apparatus 200. The synchronization signal is, for example, an NR-PSS and an NR-SSS. The system information is transmitted via, for example, a NR-PBCH. Further, the system information may be referred to as broadcast information. The base station apparatus 100 and the user apparatus 200 are enabled to transmit and receive a signal by performing the beamforming. The user apparatus 200 is a communication apparatus, that has a wireless communication function, such as a smart-phone, a mobile phone, a tablet, a wearable terminal, an M2M (Machine-to-Machine) communication module, etc. The user apparatus 200 is wirelessly connected to the base station apparatus 100, and uses various communication services provided by the wireless communication system. As illustrated in FIG. 1, in an initial access stage, the user apparatus 200 transmits a random access preamble signal to the base station apparatus 100. The random access is performed based on RMSI (Remaining minimum system information) in addition to the system information received from the base station apparatus 100 via NR-PBCH. The RMSI is system information that is received via NR-PDSCH (Physical downlink shared channel) that is scheduled according to NR-PDCCH (Physical downlink control channel). The RMSI includes, for example, information necessary for the initial access, such as RACH setting.

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal by using a transmission beam" may be replaced by "transmitting a precoding-vector-multiplied signal (a signal precoded by a precoding vector)". Similarly, "receiving a signal by using a reception beam" may be replaced by "multiplying the received signal by a predetermined weight vector." Further, "transmitting a signal by using a transmission beam" may be expressed by "transmitting a signal via a specific antenna port". Similarly, "receiving a signal by using a reception beam" may be expressed by "receiving a signal via a specific antenna port." The antenna port refers to a logical antenna port or a physical antenna port defined in 3GPP standards. It should be noted that methods in which the transmission beam and the reception beam are formed are not limited to the methods described above. For example, a method may be used in which a base station apparatus 100 having plural antennas changes each of the antenna angles and a user apparatus 200 having plural antennas changes each of the antenna angles. A method in which the method of using precoding vectors and the method of changing antenna angles are combined may be used, or different antenna panels may be switched. The method of switching multiple antenna panels may be combined with other methods, or some other methods may be used. Further, for example, multiple transmission beams different from each other may be used in a high frequency band. An operation using multiple transmission beams is referred to as a "multi-beam operation", and an operation using a single transmission beam is referred to as a "single-beam operation".

Embodiment

In the following, one or more embodiments will be described.

Figure 2:
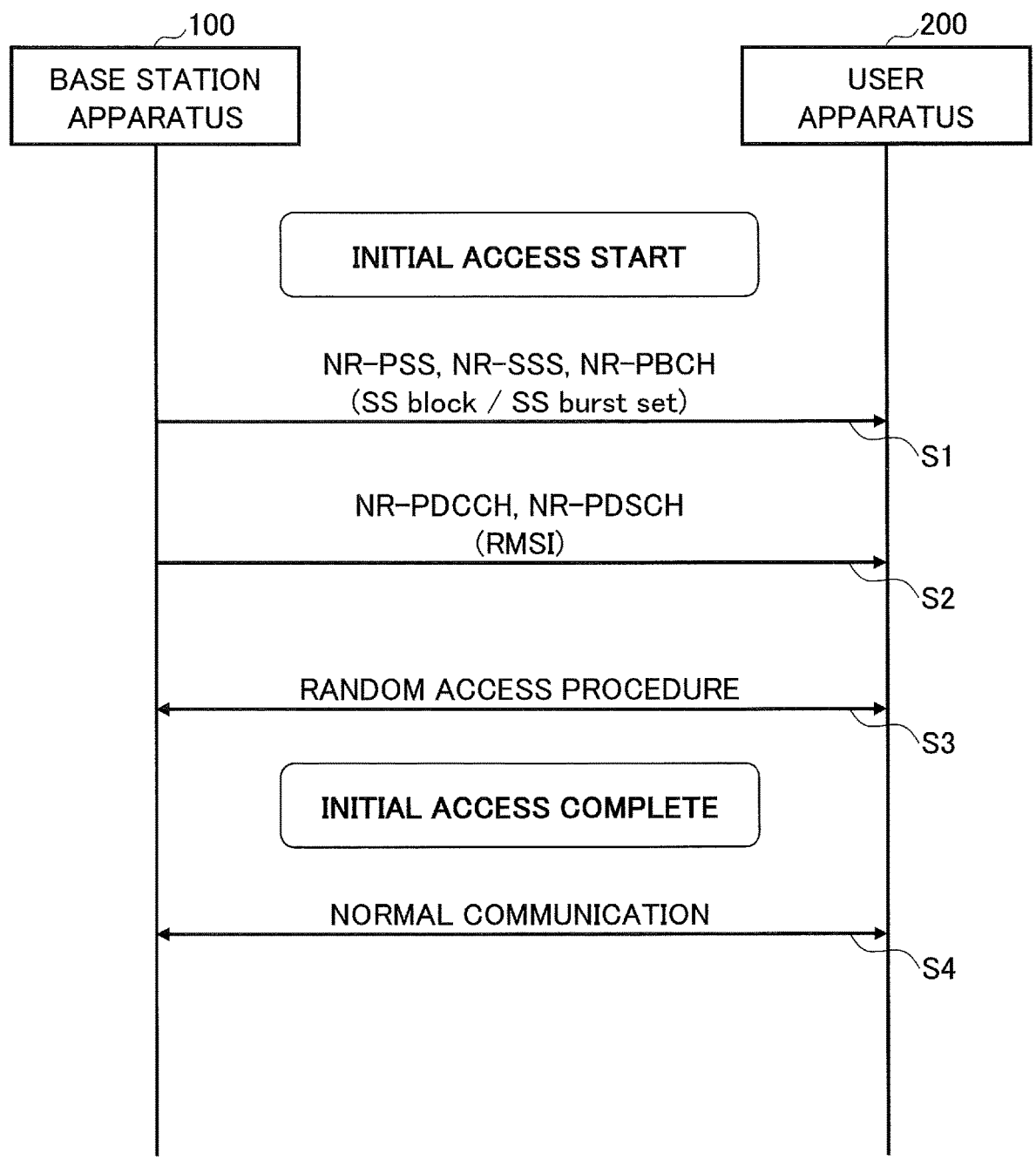
FIG. 2 is an example of an initial access sequence according to an embodiment of the present invention.

FIG. 2 is an example of an initial access sequence according to an embodiment of the present invention. When initial access is started, in step S1, the base station apparatus 100 transmits an NR-PSS, an NR-SSS, and an NR-PBCH (i.e., SS block) to the user apparatus 200. The NR-PBCH includes a part of system information. The base station apparatus 100 repeatedly transmits an SS burst set including multiple SS blocks to the user apparatus 200 at a cycle of SS burst set periodicity. In the case where multiple SS blocks are included in a SS burst set, the multiple SS blocks may be associated with corresponding different beams under the multi-beam operation environment.

With respect to the above, the user apparatus 200 receives the NR-PSS transmitted from the base station apparatus 100, and uses the NR-PSS for identifying at least a part of an initial time, a frequency synchronization, and a cell ID (identity). Further, the user apparatus 200 receives the NR-SSS transmitted from the base station apparatus 100, and uses the NR-SSS for identifying at least a part of the cell ID. Further, the user apparatus 200 obtains information used for obtaining a part of system information necessary for the initial access (e.g., a system frame number (SFN), other system information RMSI, etc.) by receiving the NR-PBCH transmitted from the base station apparatus 100.

Subsequently, in step S2, other system information including the RMSI is received via a NR-PDSCH scheduled according to the NR-PDCCH. The RMSI includes information that is used for identifying a resource for performing a random access procedure (i.e., RACH resource), a preamble format, etc.

In the case where multiple SS blocks are included in a SS burst set, upon receiving an SS block, the user apparatus 200 starts the random access procedure by transmitting a preamble via a RACH resource that is associated with the obtained SS block (S3).

When the random access procedure between the base station apparatus 100 and the user apparatus 200 is successful in step S3, the initial access is completed and a normal communication is started (S4).

Figure 3:
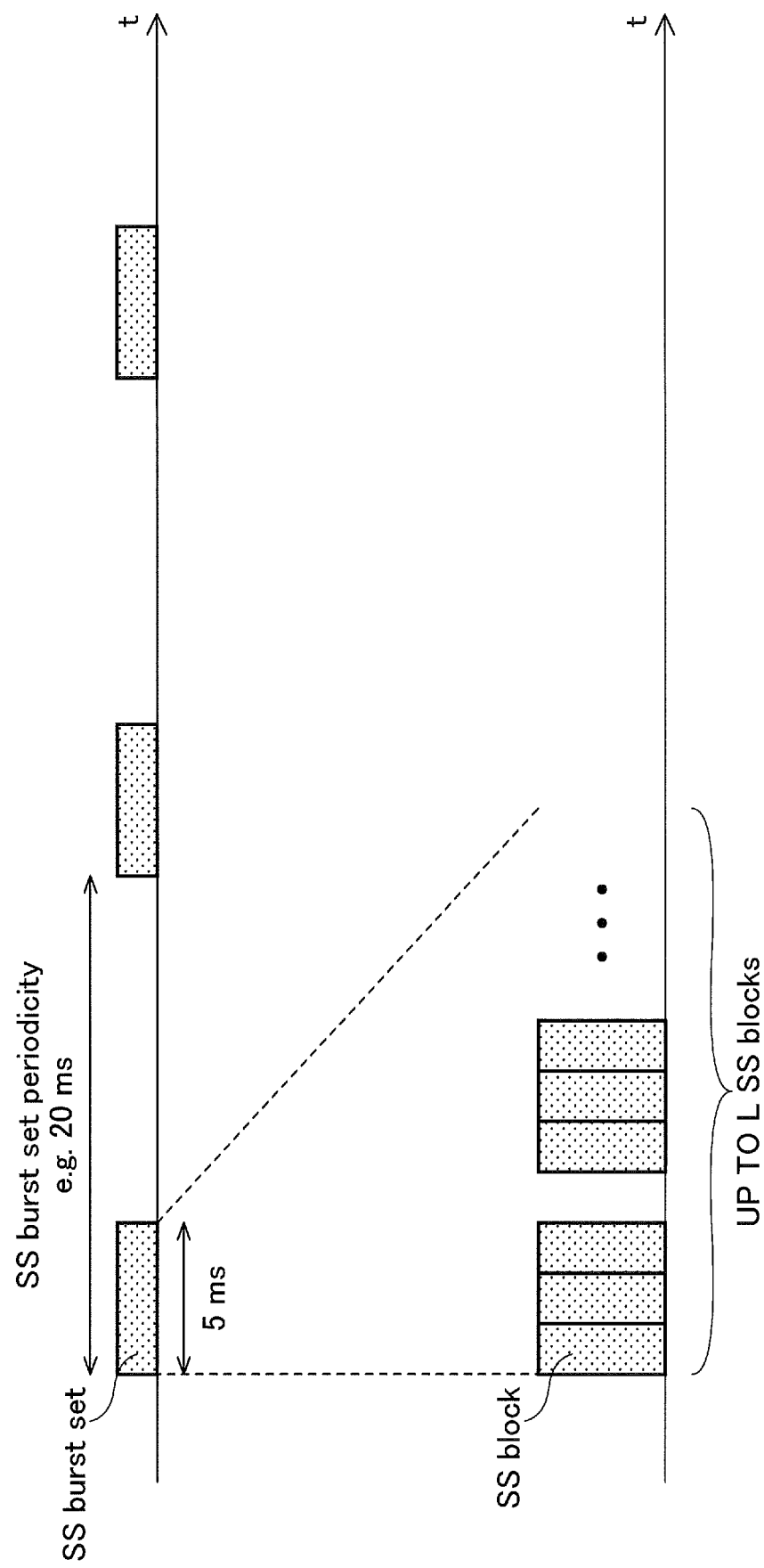
FIG. 3 is a drawing illustrating an SS burst set according to an embodiment of the present invention.

FIG. 3 is a drawing illustrating an SS burst set according to an embodiment of the present invention. As illustrated in FIG. 3, the SS burst set includes as many as one to L SS blocks. Resource candidates used for transmitting the SS blocks are included in a 5 ms period. It is not necessary for SS blocks to be arranged in all of the L candidate locations in the SS burst set. The number of the SS blocks transmitted from the base station apparatus 100 and arranged in the L candidate locations is equal to or less than L according to the actual operation. The resources in candidate locations, in which the SS blocks are not arranged, are used for normal communications. In other words, L indicates the maximum number of the SS blocks in a SS burst set. Further, L may be a different value according to the frequency band. For example, L=4 in a frequency band equal to or less than 3 GHz, L=8 in a frequency band between 3 GHz and 6 GHz, and L=64 in a frequency band between 6 GHz and 52.6 GHz.

Further, in an example illustrated in FIG. 3, "SS burst set periodicity", that indicates a cycle at which SS burst sets are transmitted, is 20 ms. The minimum value of the "SS burst set periodicity" may be 5 ms.

Figure 4:
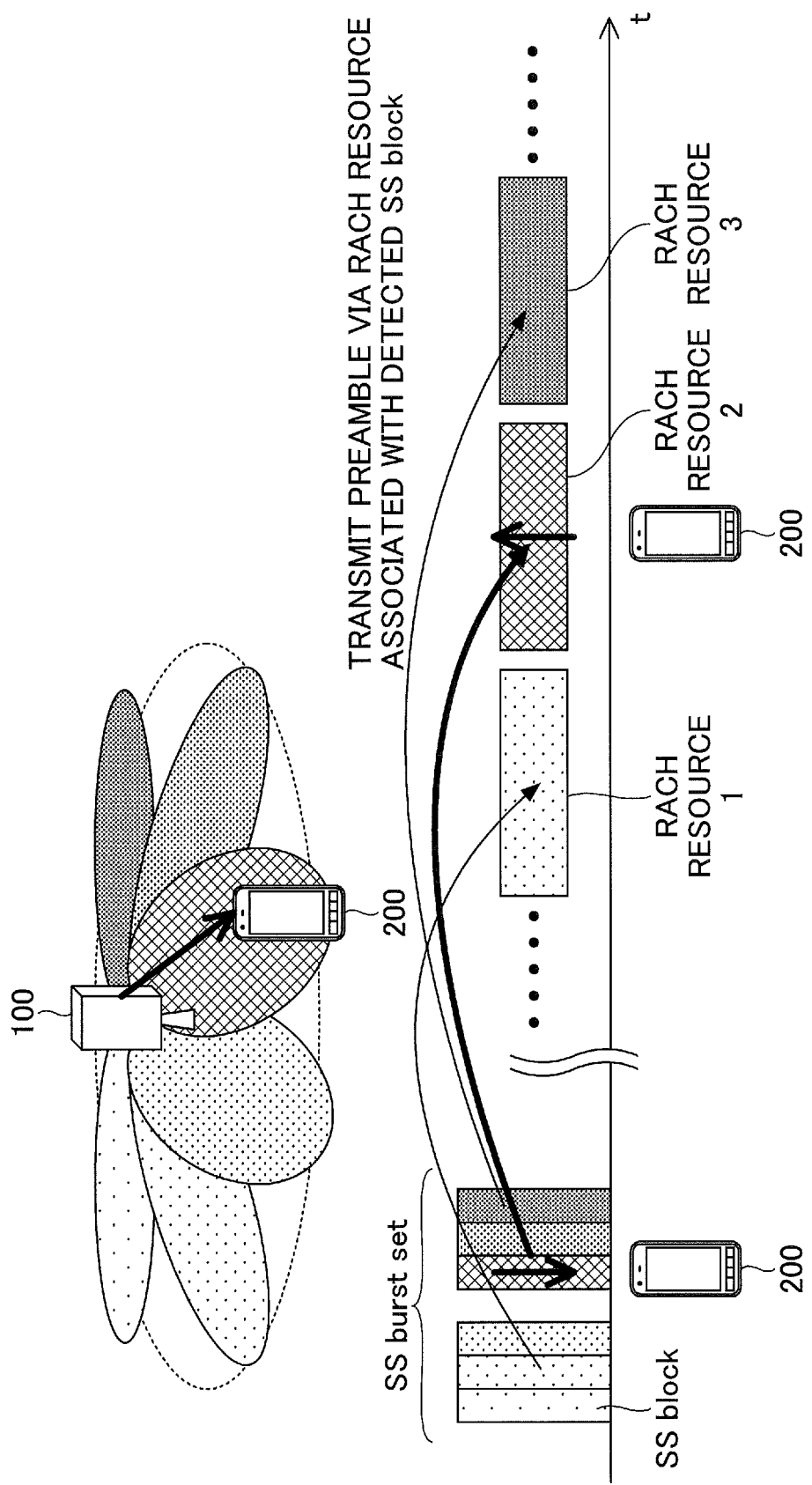
FIG. 4 is a drawing illustrating a RACH resource that is associated with an SS block according to an embodiment of the present invention.

FIG. 4 is a drawing illustrating a RACH resource that is associated with an SS block according to an embodiment of the present invention. As illustrated in FIG. 4, in NR, an SS burst set including the SS blocks associated with beams is transmitted from the base station apparatus 100. The user apparatus 200 receives a detectable SS block, and starts an initial access procedure by transmitting a preamble via a RACH resource that is associated with the received SS block. The RACH resource may be associated with a beam.

In an example illustrated in FIG. 4, the user apparatus 200 receives the fourth SS block included in the SS burst set, and transmits a preamble via a RACH resource 2 that is associated with the fourth SS block. Further, in an example illustrated in FIG. 4, the second SS block included in the SS burst set is associated with a RACH resource 1, and the sixth SS block included in the SS burst set is associated with a RACH resource 3. Further, there is an SS block index corresponding to a SS block. For example, the SS block index of the fourth SS block included in the SS burst set is defined as "4".

Figure 5:
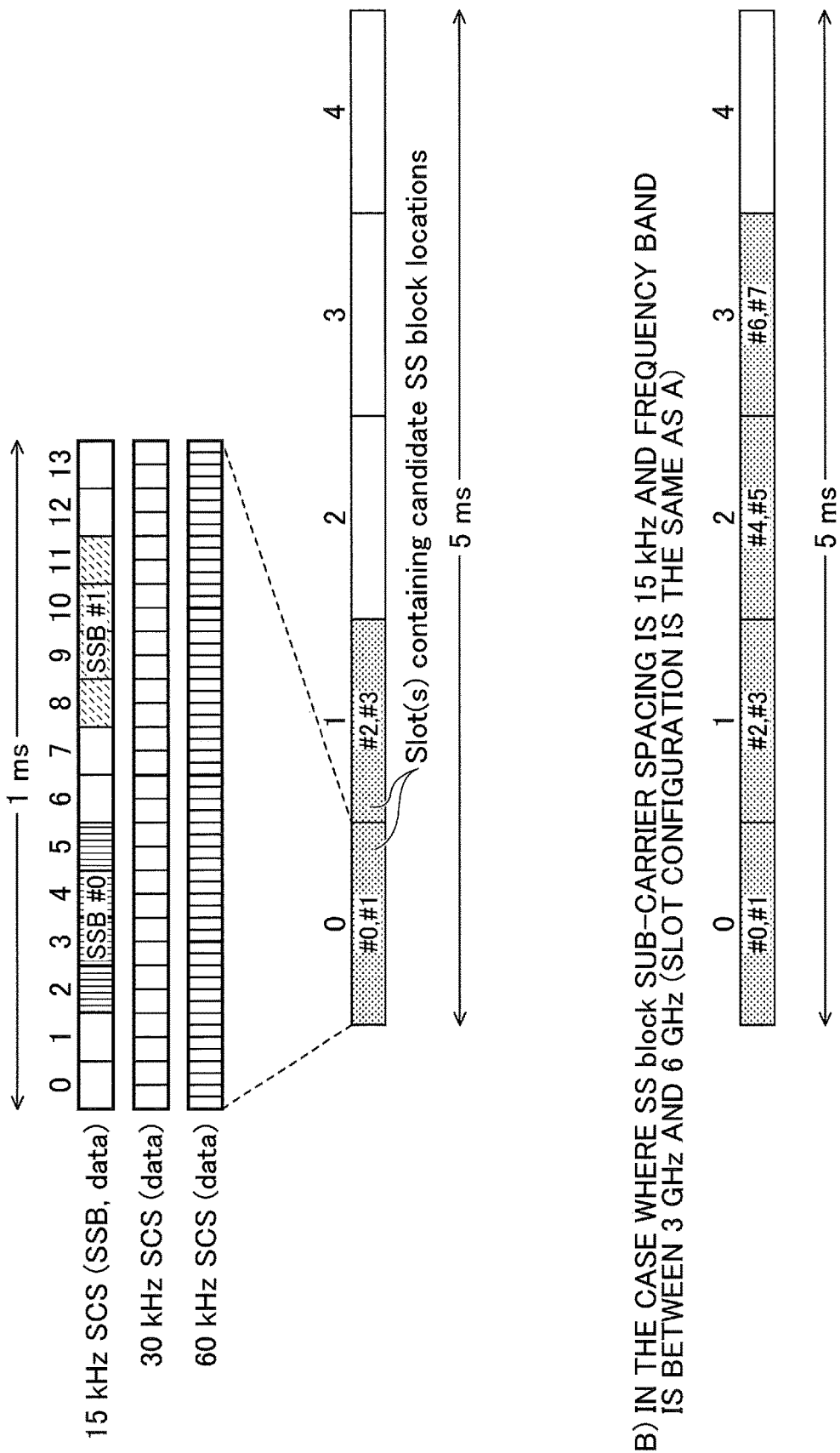
FIG. 5 is a drawing illustrating a configuration example (1) of an SS burst set according to an embodiment of the present invention.

FIG. 5 is a drawing illustrating a configuration example (1) of an SS burst set according to an embodiment of the present invention. In FIG. 5, an example is shown in which the SS burst set is arranged in a time unit of 5 ms or 1 ms in the radio frame.

FIG. 5A is a configuration example of an SS burst set in the case where the subcarrier spacing of radio signals via which SS blocks are transmitted is 15 kHz and where the frequency band is up to 3 GHz. First two slots, of the five slots corresponding to 5 ms, include SS blocks (hereinafter, also referred to as "SSB"). An SSB #0 and an SSB #1 are arranged in a slot #0, and an SSB #2 and an SSB #3 are arranged in a slot #1. A slot with 1 ms includes 14 symbols from a symbol #0 to a symbol #13. As illustrated in FIG. 5A, the SSB #0 is arranged in the radio frame with 15 kHz SCS (subcarrier spacing) from a symbol #2 to a symbol #5, and the SSB #1 is arranged in the radio frame from a symbol #8 to a symbol #11. The radio frame with 15 kHz SCS is used for transmitting and receiving an SSB and data, and the radio frames with 30 kHz SCS and 60 kHz SCS are used for transmitting and receiving data.

FIG. 5B is a configuration example of an SS burst set in the case where the subcarrier spacing of radio signals via which SS blocks are transmitted is 15 kHz and where the frequency band is between 3 GHz and 6 GHz. First four slots, of the five slots corresponding to 5 ms, include SS blocks. The SSB #0 and the SSB #1 are arranged in the slot #0, the SSB #2 and the SSB #3 are arranged in the slot #1, the SSB #4 and the SSB #5 are arranged in the slot #2, and the SSB #6 and the SSB #7 are arranged in the slot #3. The arrangement of the SS blocks in the symbols in a slot may be the same as in FIG. 5A.

FIG. 6 is a drawing illustrating a configuration example (2) of an SS burst set according to an embodiment of the present invention. In FIG. 6, an example is shown in which the SS burst set is arranged in a time unit of 5 ms or 1 ms in the radio frame.

FIG. 6A is a configuration example of an SS burst set in the case where the subcarrier spacing of radio signals via which SS blocks are transmitted is 30 kHz. The SSB #0 is arranged in a slot from a symbol #4 to a symbol #7, and the SSB #1 is arranged from a symbol #8 to a symbol #11. The SSB #2 is arranged in the subsequent slot from a symbol #2 to a symbol #5, and the SSB #3 is arranged from a symbol #6 to a symbol #9. The SSB #0 through the SSB #3 are arranged in two consecutive slots. The radio frame with 30 kHz SCS is used for transmitting and receiving an SSB and data, and the radio frames with 15 kHz SCS and 60 kHz SCS are used for transmitting and receiving data.

FIG. 6B is another configuration example of an SS burst set in the case where the subcarrier spacing of radio signals via which SS blocks are transmitted is 30 kHz. The SSB #0 is arranged in a slot from a symbol #2 to a symbol #5, and the SSB #1 is arranged from a symbol #8 to a symbol #11. The SSB #2 is arranged in the subsequent slot from a symbol #2 to a symbol #5, and the SSB #3 is arranged from a symbol #8 to a symbol #11. The SSB #0 through the SSB #3 are arranged in two consecutive slots. The radio frame with 30 kHz SCS is used for transmitting and receiving an SSB and data, and the radio frames with 15 kHz SCS and 60 kHz SCS are used for transmitting and receiving data.

An example of an SS burst set in the case where the frequency band of radio signals used for transmitting SS blocks is between 0 Hz and 3 GHz is illustrated by slot units in 5 ms in FIG. 6C. It is assumed that the slots are referred to as slots #0 to #9 in the time order. As illustrated in FIG. 6C, SSB #0 and SSB #1 are arranged in slot #0, and SSB #2 and SSB #3 are arranged in slot #1.

An example of an SS burst set in the case where the frequency band of radio signals used for transmitting SS blocks is between 3 Hz and 6 GHz is illustrated by slot units in 5 ms in FIG. 6D. It is assumed that the slots are referred to as slots #0 to #9 in order of time. As illustrated in FIG. 6D, SSB #0 and SSB #1 are arranged in slot #0, SSB #2 and SSB #3 are arranged in slot #1, SSB #4 and SSB #5 are arranged in slot #2, and SSB #6 and SSB #7 are arranged in slot #3.

FIG. 7 is a drawing illustrating a configuration example (3) of an SS burst set according to an embodiment of the present invention. In FIG. 7, examples are shown in which the SS burst set is arranged in a time unit of 5 ms or 0.25 ms in the radio frame.

FIG. 7A is a configuration example of an SS burst set in the case where the subcarrier spacing of radio signals via which SS blocks are transmitted is 120 kHz and where the frequency band is between 6 GHz and 52.6 GHz. It is assumed that the slots in the figure illustrated by slot units in 5 ms are slot #0 to slot #39 in order of time. SSB #32 is arranged in slot #20 from symbol #4 to symbol #7, and SSB #33 is arranged from symbol #8 to symbol #11. SSB #34 is arranged in slot #21 from symbol #2 to symbol #5, and SSB #35 is arranged from symbol #6 to symbol #9. With the same configuration in slot, SSBs from #0 to #15 are arranged in slots from #0 to #7, SSBs from #16 to #31 are arranged in slots #10 to #17, SSBs from #32 to #47 are arranged in slots from #20 to #27, and SSBs from #48 to #63 are arranged in slots from #30 to #37. The radio frame with 120 kHz SCS is used for transmitting and receiving SSBs and data, and the radio frame with 60 kHz SCS is used for transmitting and receiving data.

FIG. 7B is a configuration example of an SS burst set in the case where the subcarrier spacing of radio signals via which SS blocks are transmitted is 240 kHz and where the frequency band is between 6 GHz and 52.6 GHz. It is assumed that the slots in the figure illustrated by slot units in 5 ms are slot #0 to slot #79 in order of time. In the drawing of FIG. 7B, one square corresponds to two slots. SSB #56 is arranged in slot #32 from symbol #8 to symbol #11, SSB #57 is arranged in slots #32 and #33 from slot #32 symbol #12 to slot #33 symbol #1, SSB #58 is arranged in slot #33 from symbol #2 to symbol #5, and SSB #59 is arranged in slot #33 from symbol #6 to symbol #9. SSB #60 is arranged in slot #34 from symbol #4 to symbol #7, SSB #61 is arranged in slot #34 from symbol #8 to symbol #11, SSB #62 is arranged in slots #34 and #35 from slot #34 symbol #12 to slot #35 symbol #1, and SSB #63 is arranged in slot #35 from symbol #2 to symbol #5. According to the same slot configuration, SSBs #0-#31 are arranged in slots #0-#15, and SSBs #32-#63 are arranged in slots #20-#35. The radio frame with 240 kHz SCS is used for transmitting and receiving SSBs, and the radio frames with 60 kHz SCS and 120 kHz SCS are used for transmitting and receiving data.

A subset of the RACH resources corresponding to the SS blocks is set as resources for the user apparatus 200 to transmit a PRACH. In the case where RACH resources corresponding to multiple SS blocks are set, for example, a different preamble index subset is allocated to a different SS block, and thus, it is possible to distinguish preambles transmitted via the same RACH resources. Therefore, when receiving a PRACH, it is possible for the base station apparatus 100 to determine to which SS block the received PRACH corresponds, and thus, it is possible to use the PRACH for reception beam generation of the base station apparatus 100 or for transmission beam generation of Msg.2, etc., in the random access procedure.

Information indicating how the SS blocks correspond to subsets of the RACH resources or to subsets of the preamble indices may be transmitted to the user apparatus 200 via broadcast information (i.e., system information) as information included in RACH configuration.

It should be noted that it is assumed that the time length of a NR PRACH preamble format including CP (Cyclic Prefix) and GP (Guard Period) is 1 ms, 3 ms, or 3.5 ms in the case where the sequence length is 839. Further, in the case where the sequence length is 139 or 127, it is assumed that the time length corresponds to 1, 2, 4, 6, or 12 symbols of data with the same subcarrier spacing. With respect to the above, it should be noted that the time length includes CP lengths corresponding to data pieces in the symbols of the data. In the case where the time length is indicated in units of symbol, the actual time length varies according to the PRACH subcarrier spacing.

It is assumed that T_s=1/30720 ms. For example, in the case where repeated four (4) symbols of PRACH preamble format are arranged in a slot from the third symbol and where the CP length corresponding to the third through sixth symbols of the data is 144 T_s, the time length of the above PRACH is (144*4)+(2048*4)=8768 T_s. In the case where the PRACH subcarrier spacing is 30 kHz, the time length of the PRACH will be the time length in which the symbol length and the CP length of the 30 kHz data are assumed. Therefore, the time length is (72*4)+(1024*4)=4384 T_s.

Here, regarding the candidate locations of the RACH resources associated with the SS blocks, the appropriate candidate locations vary in accordance with: the subcarrier spacing of the radio frame via which a SS block, RMSI, or data is transmitted; locations of the actually-transmitted SS blocks; etc. Further, the appropriate locations of the RACH resources arranged on the time axis may vary according to the permitted delay time, scheduling of other channels, etc. Further, it is necessary to select a PRACH preamble format according to the required cell coverage and the surrounding environment such as interference. Further, regarding the time length of the PRACH preamble format, various lengths are selected as required.

Therefore, in order to set appropriate candidate locations of the RACH resources, the association between the SS blocks and the RACH resources may be specified by assuming the subcarrier spacings of RMSI, data, SS blocks, or the PRACH in advance. The association may be specified by the RACH configuration, etc.

With respect to each of the SS block subcarrier spacings, there are a plurality of different combinations of subcarrier spacings of RMSI, data, or PRACH as described below. For example, the SS block subcarrier spacing is 15 kHz or 30 kHz in the case where the frequency band is equal to or less than 6 GHz, and is 120 kHz or 240 kHz in the case where the frequency band is equal to or greater than 6 GHz. With respect to the above, the subcarrier spacing of RMSI or data is 15 kHz, 30 kHz, or 60 kHz in the case where the frequency band is equal to or less than 6 GHz, and is 60 kHz or 120 kHz in the case where the frequency band is equal to or greater than 6 GHz. Further, the subcarrier spacing of the PRACH is 1.25 kHz, 5 kHz, 15 kHz, or 30 kHz in the case where the frequency band is equal to or less than 6 GHz, and is 60 kHz or 120 kHz in the case where the frequency band is equal to or greater than 6 GHz.

There are multiple combinations of the subcarrier spacings and the slot time length varies in accordance with the subcarrier spacings. Therefore, by assuming the subcarrier spacings in advance, it is possible to use an assumed subcarrier spacing for the RACH resources. Further, when assuming the PRACH subcarrier spacing, in the case where the PRACH subcarrier spacing is 1.25 kHz or 5 kHz, the PRACH subcarrier spacing may be assumed as 15 kHz.

For example, the PRACH subcarrier spacing may be assumed to be the same as the subcarrier spacing of RMSI or data. In other words, the user apparatus 200 may determine that the subcarrier spacing of the received RMSI or data is an implicit indication of the PRACH subcarrier spacing. However, as the combinations of the subcarrier spacings are defined as described above, in the case where the frequency band is equal to or less than 6 GHz and where the subcarrier spacing of RMSI or data is 60 kHz, it is assumed that the PRACH subcarrier spacing is 30 kHz.

Further, in order to indicate to the user apparatus 200 how SS blocks are associated with RACH resources, the following information may be transmitted to the user apparatus 200.

1) The PRACH preamble format may be transmitted as common information for all SS blocks, or may be transmitted as SS block specific information for each of the SS blocks.

2) The number of RACH resources, associated with an SS block, arranged in the time direction may be transmitted as common information for all SS blocks, or may be transmitted as SS block specific information for each of the SS blocks. The number of RACH resources arranged in the time direction is the number of repeatedly and continuously arranged resources corresponding to a single preamble format.

3) By defining the RACH resources corresponding to all of the actually transmitted SS blocks as a set, the iteration cycle and the number of iterations of the sets in the time direction may be transmitted. For example, a ratio with respect to the SS burst set periodicity may be transmitted. In the case where the ratio is 1/2, a set of the RACH resources may be arranged every time two SS burst sets are transmitted. In the case where the ratio is 4, four sets of the RACH resources may be arranged every time a SS burst set is transmitted. Further, the cycle of the sets of the RACH resources may be transmitted as an absolute value, or the number of the sets of the RACH resources for the SS burst set periodicity may be transmitted.

4) By assigning an index to each of the arrangement formats (patterns) of the RACH resources corresponding to the SS blocks, the index may be transmitted. By specifying a certain arrangement format in advance, the index may not need to be transmitted. The arrangement format may be any one of the arrangement formats described in an embodiment. For example, the following arrangement format may be set.

4-1) An arrangement format, in which the RACH resources are arranged within a slot in which the SS blocks are included, and an arrangement format, in which the RACH resources are arranged within a slot in which the SS blocks are not included, are set as different arrangement formats.

4-2) An arrangement format, in which the RACH resources are arranged in consecutive slots, and an arrangement format, in which the slots in which the RACH resources are arranged may have a slot gap, are set as different arrangement formats.

5) Information indicating a start timing slot index of the first RACH resource, of the RACH resources corresponding to the actually-transmitted SS blocks, may be transmitted. For example, the index may be an offset from the actually-transmitted first or last SS block. The index may be a system frame index, a slot index, or the like. Further, for example, in the case where the cycle of the RACH resources is 10 ms, only the slot index may be transmitted and the cycle may be specified in advance and may not need to be explicitly indicated. Further, the start timing slot index of the RACH resources corresponding to the SS blocks may be implicitly indicated by the time length of the PRACH preamble format, the number of iterations of the RACH resources, and the arrangement pattern of the RACH resources. In other words, the slot index may be associated with the time length of the PRACH preamble format, the number of iterations of the RACH resources, and the arrangement pattern of the RACH resources in advance. Further, the arrangement of the first RACH resource, of the RACH resources corresponding to the SS blocks, may be indicated explicitly. Further, in the case where the RACH resources are arranged within a slot in which the SS blocks are arranged, the arrangement of the first RACH resource may be indicated by the arrangement pattern of the RACH resources, may be indicated by the slot index, or may be implicitly indicated by specifying a short time length format in which the PRACH preamble format is one or two symbols. Further, the arrangement of the RACH resources corresponding to all of the SS blocks may be implicitly indicated and specified by transmitting a part or all of: the start location of the slots in which the RACH resources are arranged; a slot gap between a slot in which the RACH resources are arranged and the subsequent slot; information included in the PRACH preamble format; the number of iterations of the RACH resources; the cycle of repeated sets of the RACH resources; the gap of the repeated sets of the RACH resources; the arrangement pattern of the repeated sets of the RACH resources; and reserved symbols.

Figure 8:
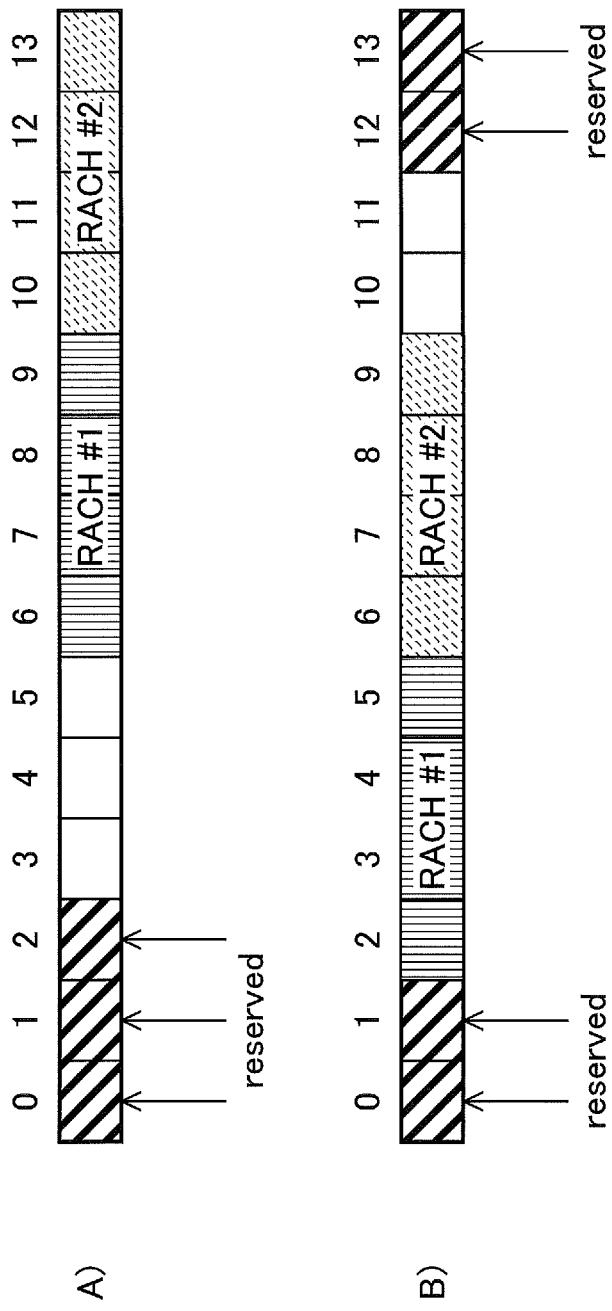
FIG. 8 is a drawing illustrating an example of RACH resource arrangement related to symbol locations in a slot according to an embodiment of the present invention.

FIG. 8 is a drawing illustrating an example of RACH resource arrangement related to symbol locations in a slot according to an embodiment of the present invention. When a PRACH preamble format with a time length less than 1 ms is used, in other words, when the preamble sequence length is 127 or 139, some symbols of: the start of the slot; the end of the slot; or the start and the end of the slot, may be indicated to the user apparatus 200 as reserved symbols that are not used as RACH resources. In the case where an appropriate arrangement cannot be performed because of the fact that, for example, the sum of the time length of the reserved symbols and the time length of the PRACH preamble format, or the time length of the PRACH preamble format alone, exceeds the slot length, the RACH resources may be arranged without considering the reserved symbols. When a PRACH preamble format with a time length less than 1 ms is used, by considering the reserved symbols, the RACH resources may be arranged from the end of the slot, or the RACH resources may be arranged from the start of the slot.

FIG. 8A illustrates a case in which the starting three symbols of the slot are specified as reserved symbols, the time length of the PRACH preamble format is four symbols, and the RACH resources are arranged on the ending side of the slot. Slots #0 to #2 are reserved symbols, RACH #1 is arranged in slots #6 to #9, and RACH #2 is arranged in slots #10 to #13. Here, RACH #1 indicates a RACH resource corresponding to SSB #1, and RACH #2 indicates a RACH resource corresponding to SSB #2 (not shown in the figure).

FIG. 8B illustrates a case in which the starting two symbols and the ending two symbols of the slot are specified as reserved symbols, the time length of the PRACH preamble format is four symbols, and the RACH resources are arranged on the starting side of the slot. Slot #0, slot #1, slot #12, and slot #13 are reserved symbols, RACH #1 is arranged in slots #2 to #5, and RACH #2 is arranged in slots #6 to #9.

FIG. 9 is a drawing illustrating a RACH resource arrangement example (1) in the case where an SS block subcarrier spacing is 15 kHz according to an embodiment of the present invention. The RACH resource arrangement, in which RACH resources are arranged in consecutive slots in which SS blocks are not arranged, may be indicated (transmitted), or may be defined in advance in the specification. By transmitting or defining a location of the start of the RACH resources, the RACH resources are arranged in the consecutive slots starting from the transmitted or defined location.

FIG. 9A illustrates a RACH resource arrangement in a case in which the subcarrier spacing of the radio signal via which SS blocks are transmitted is 15 kHz, the frequency band is up to 3 GHz, an offset from the start of the SS blocks to the RACH resources is indicated as 2, the time length of the PRACH preamble format is 1 ms, and the number of iterations of the RACH resources is 1. SSB #0 and SSB #1 are arranged in slot #0, and SSB #2 and SSB #3 are arranged in slot #1. The start of the SS blocks, SSB #0, is arranged in slot #0. Therefore, the start of the RACH resources, RACH #0, is arranged in slot #2 that is obtained by adding the offset, 2, to slot #0. Subsequently, RACH #1 is arranged in slot #3, RACH #2 is arranged in slot #4, and RACH #3 is arranged in slot #5. RACH #0 corresponds to SSB #0, RACH #1 corresponds to SSB #1, RACH #2 corresponds to SSB #2, and RACH #3 corresponds to SSB #3.

FIG. 9B illustrates a RACH resource arrangement in a case in which the subcarrier spacing of the radio signal via which SS blocks are transmitted is 15 kHz, the frequency band is between 3 GHz and 6 GHz, a slot index is indicated as 5, the time length of the PRACH preamble format is 2 symbols, the number of iterations of the RACH resources is 2, and starting two symbols in a slot are reserved symbols. SSB #0 and SSB #1 are arranged in slot #0, SSB #2 and SSB #3 are arranged in slot #1, SSB #4 and SSB #5 are arranged in slot #2, and SSB #6 and SSB #7 are arranged in slot #3. The start of the RACH resources is arranged in slot #5 because the slot index is 5. RACHs #0 are arranged in symbols #2 to #5 because the starting two symbols in a slot are reserved symbols. Symbol #2 and symbol #3 correspond to the first RACH resource, symbol #4 and symbol #5 correspond to the second RACH resource, and the number of iterations is 2. Similarly, RACHs #1 are arranged in symbols #6 to #9, and RACHs #2 are arranged in symbols #10 to #13. RACHs #3 are arranged in slot #6 symbols #2 to #5, RACHs #4 are arranged in symbols #6 to #9, and RACHs #5 are arranged in symbols #10 to #13. RACHs #6 are arranged in slot #7 symbols #6 to #9, and RACHs #7 are arranged in symbols #10 to #13. Similar to FIG. 9A, RACHs #0 to #7 correspond to SSBs #0 to #7.

FIG. 10 is a drawing illustrating a RACH resource arrangement example (2) in the case where an SS block subcarrier spacing is 15 kHz according to an embodiment of the present invention. The RACH resource arrangement, in which RACH resources are arranged in non-consecutive slots in which SS blocks are not arranged, may be indicated (transmitted), or may be defined in advance in the specification. By transmitting or defining a location of the start of the RACH resources, the subsequent RACH resources are arranged starting from the transmitted or defined location. For example, the subsequent RACH resources are arranged as follows.

1) Every time one slot amount of the RACH resources are arranged, the subsequent RACH resources may be arranged by skipping a specified number of slots.

2) After the RACH resources corresponding to one SS block or one pattern amount of SS blocks (SSB #0 and SSB #1 in FIG. 10A) are arranged, the subsequent RACH resources may be arranged by skipping a specified number of slots.

3) Arrangement may be performed by combining 1) and 2).

4) The "specified number", used for skipping the slots in 1) and 2), may be indicated to the user apparatus 200 individually, or a number equal to an offset from the actually transmitted ending SS block to the starting RACH resource location, or the like, may be used as the specified number. Further, for example, in the case where the start of the RACH resources is arranged by skipping one slot as an offset from the ending SS block, similarly, each of the RACH resources may be arranged by skipping one slot.

FIG. 10A illustrates a RACH resource arrangement in a case in which the subcarrier spacing of the radio signal via which SS blocks are transmitted is 15 kHz, the frequency band is up to 3 GHz, an offset from the end of the SS blocks to the RACH resources is indicated as 2, the time length of the PRACH preamble format is 1 ms, and the number of iterations of the RACH resources is 1. SSB #0 and SSB #1 are arranged in slot #0, and SSB #2 and SSB #3 are arranged in slot #1. The end of the SS blocks, SSB #3, is arranged in slot #1. Therefore, the start of the RACH resources, RACH #0, is arranged in slot #3 that is obtained by adding the offset, 2, to slot #1. Next, similar to the arrangement in which RACH #0 is arranged by skipping, as an offset, one slot from the end of the SS blocks, each of the subsequent RACH resources is arranged by skipping one slot. Therefore, RACH #0 is arranged in slot #3, RACH #1 is arranged in slot #5, and RACH #2 is arranged in slot #7. RACHs #0 to #3 correspond to SSBs #0 to #3, respectively.

FIG. 10B illustrates a RACH resource arrangement in a case in which the subcarrier spacing of the radio signal via which SS blocks are transmitted is 15 kHz, the frequency band is between 3 GHz and 6 GHz, an offset from the start of the SS blocks to the RACH resources is indicated as 1, the time length of the PRACH preamble format is 1 ms, and the number of iterations of the RACH resources is 1. Here, the actually transmitted SS blocks are SSB #0, SSB #1, SSB #4, and SSB #5. Therefore, as illustrated in the figure, SSB #0 and SSB #1 are arranged in slot #0, and SSB #4 and SSB #5 are arranged in slot #2. As described above, in the case where the number of the actually transmitted SS blocks is less than the maximum value L of the candidate number, the RACH resources may be arranged in a symbol or slot as a candidate location for SS blocks which is not used for transmitting the SS blocks in actuality. When there exists a candidate location for SS blocks which is not used for transmitting the SS blocks in actuality, the originally arranged RACH resources may be moved forward into the available candidate location. With respect to the above, the RACH resources may be arranged by assuming that the maximum number L of the SS blocks are always arranged. As illustrated in FIG. 10B, no SS block is arranged in slot #1, it is possible to arrange a RACH resource in slot #1, and RACH #0 is arranged in slot #1. Subsequently, RACH #1 is arranged in slot #3, RACH #2 is arranged in slot #4, and RACH #3 is arranged in slot #5. RACH #0 corresponds to SSB #0, RACH #1 corresponds to SSB #1, RACH #2 corresponds to SSB #4, and RACH #3 corresponds to SSB #5.

FIG. 10B illustrates only a case of subcarrier spacing 15 kHz. However, also in cases of other subcarrier spacings, similarly, the RACH resources may be arranged in a symbol or slot that is a candidate location for SS blocks which is not used for transmitting the SS blocks in actuality.

Regarding the examples of the RACH resource arrangement illustrated in FIG. 8, FIG. 9, and FIG. 10, for example, even in the case where the assumed subcarrier spacing is 15 kHz, only the slot length is changed and the examples of the RACH resource arrangement are still similarly applicable. Further, even in the case where the subcarrier spacing of the SS blocks is other than 15 kHz, the examples of the RACH resource arrangement are still similarly applicable.

Figure 11:
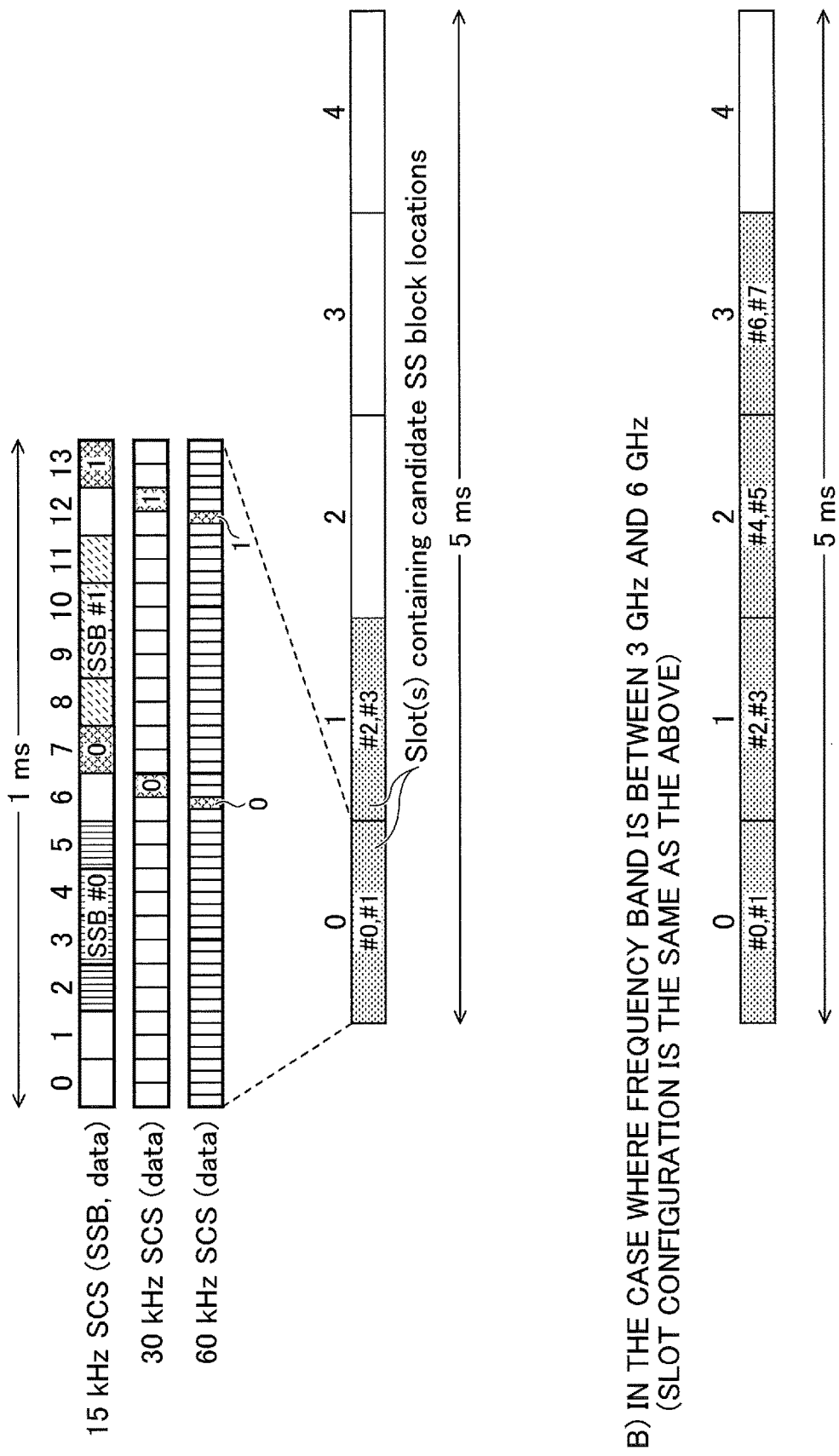
FIG. 11 is a drawing illustrating a RACH resource arrangement example (3) in the case where an SS block subcarrier spacing is 15 kHz according to an embodiment of the present invention.

FIG. 11 is a drawing illustrating a RACH resource arrangement example (3) in the case where an SS block subcarrier spacing is 15 kHz according to an embodiment of the present invention. The RACH resource arrangement in a slot in which the SS blocks are arranged (the slot for which the SS block subcarrier spacing is assumed) may be indicated (transmitted), or may be defined in advance in the specification.

FIG. 11A illustrates a RACH resource arrangement in a case in which the subcarrier spacing of the radio signal via which SS blocks are transmitted is 15 kHz, the frequency band is up to 3 GHz, the time length of the PRACH preamble format is one (1) symbol, and the number of iterations of the RACH resources is one (1). As illustrated in FIG. 11A, the RACH resources may be arranged by skipping one (1) symbol from the end of the SS blocks. The skipped symbol may be used for transmitting and receiving data, etc. Multiple symbols may be skipped according to the PRACH preamble format or according to the number of iterations of the RACH resources corresponding to one format. By skipping the symbols, it is possible to have sufficient (enough) processing time in the case where the user apparatus 200 performs transmission via the corresponding RACH resources right after the SS blocks have been received. Further, a relative location, of a symbol in which the RACH resources are arranged, with respect to the SS blocks may be indicated or defined. In FIG. 11A, "2" is indicated or defined.

In FIG. 11A, SSB #0 and SSB #1 are arranged in slot #0, and SSB #2 and SSB #3 are arranged in slot #1. SSB #0 is arranged in slot #0 from symbol #2 to symbol #5, symbol #6 is skipped, and RACH #0 is arranged in symbol #7. SSB #1 is arranged in symbols #8 to #11, symbol #12 is skipped, and RACH #1 is arranged in symbol #13. Here, regarding the radio frames with 30 kHz or 60 kHz SCS, descriptions will be made by using the number of symbols from the start symbol. In other words, symbol #0 to symbol #26 are arranged in the 30 kHz SCS radio frame, and symbol #0 to symbol #52 are arranged in the 60 kHz SCS radio frame. In the 30 kHz SCS radio frame, as illustrated in FIG. 11A, RACH #0 may be arranged in symbol #12, 1:1 and RACH #1 may be arranged in symbol #24. In the 60 kHz SCS radio frame, as illustrated in FIG. 11A, RACH #0 may be arranged in symbol #25, and RACH #1 may be arranged in symbol #47. In each of the radio frames, the RACH resources are arranged by skipping one symbol from the SS blocks. In-slot arrangement in slot #1 is the same as the in-slot arrangement in slot #0.

FIG. 11B illustrates RACH resource arrangement in a case where the subcarrier spacing of radio signals via which SS blocks are transmitted is 15 kHz and where the frequency band is between 3 GHz and 6 GHz. SSB #0 and SSB #1 are arranged in slot #0, SSB #2 and SSB #3 are arranged in slot #1, SSB #4 and SSB #5 are arranged in slot #2, and SSB #6 and SSB #7 are arranged in slot #3. The in-slot arrangement is the same as in FIG. 11A.

Figure 12:
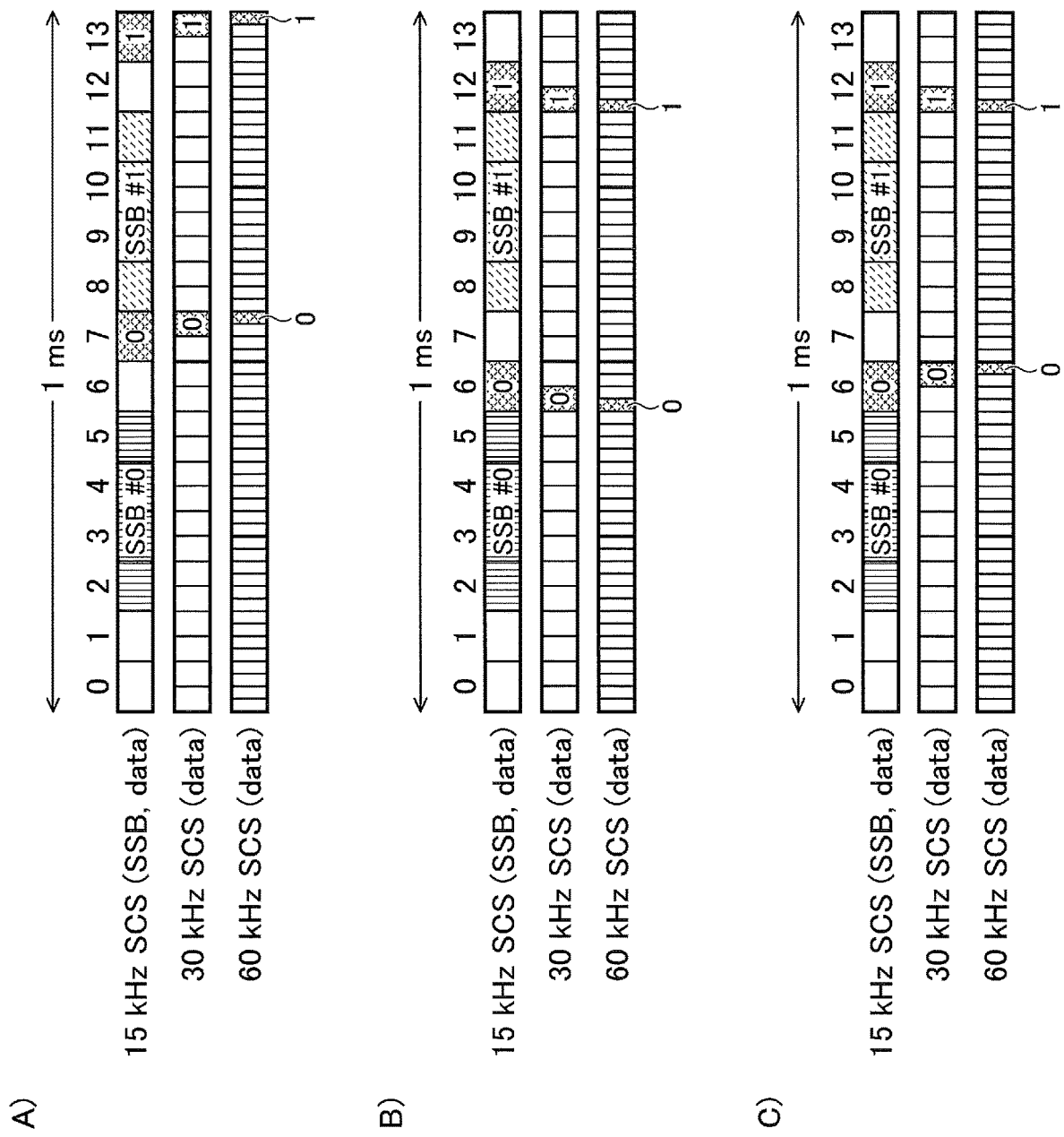
FIG. 12 is a drawing illustrating a RACH resource arrangement example (4) in the case where an SS block subcarrier spacing is 15 kHz according to an embodiment of the present invention.

FIG. 12 is a drawing illustrating a RACH resource arrangement example (3) in the case where an SS block subcarrier spacing is 15 kHz according to an embodiment of the present invention. With respect to the RACH resource arrangement in FIG. 11, the respective RACH resource arrangements in FIG. 12 are an arrangement in which the RACH resources are arranged on the slot end side within a slot, an arrangement in which the RACH resources are arranged on the slot start side within a slot, and an arrangement in which the RACH resources are arranged in line with the slot end of the 30 kHz or 60 kHz SCS radio frame. The RACH resource arrangements may be indicated (transmitted) or may be defined in advance in the specification.

In FIG. 12A, arrangement of SSB #0 and SSB #1 in a slot is the same as in FIG. 11. RACH #0 is arranged in symbol #7, and RACH #1 is arranged in symbol #13. In the 30 kHz SCS radio frame, RACH #0 is arranged in symbol #14, and RACH #1 is arranged in symbol #26. In the 60 kHz SCS radio frame, RACH #0 is arranged in symbol #28, and RACH #1 is arranged in symbol #52. In FIG. 12A, the RACH resources are arranged on the slot end side within a slot.

In FIG. 12B, arrangement of SSB #0 and SSB #1 in a slot is the same as in FIG. 11. RACH #0 is arranged in symbol #6, and RACH #1 is arranged in symbol #12. In the 30 kHz SCS radio frame, RACH #0 is arranged in symbol #11, and RACH #1 is arranged in symbol #23. In the 60 kHz SCS radio frame, RACH #0 is arranged in symbol #21, and RACH #1 is arranged in symbol #45. In FIG. 12B, the RACH resources are arranged on the slot start side within a slot.

In FIG. 12C, arrangement of SSB #0 and SSB #1 in a slot is the same as in FIG. 11. RACH #0 is arranged in symbol #6, and RACH #1 is arranged in symbol #12. In the 30 kHz SCS radio frame, RACH #0 is arranged in symbol #12, and RACH #1 is arranged in symbol #23. In the 60 kHz SCS radio frame, RACH #0 is arranged in symbol #24, and RACH #1 is arranged in symbol #45. In FIG. 12B, the RACH resources are arranged within a slot in line with the slot end of the 30 kHz or 60 kHz SCS radio frame.

By arranging the RACH resources as illustrated in FIG. 12 and by arranging the RACH resources at an early timing using a gap between the SS blocks, it is possible to respond to a case in which acceptable (permitted, allowable) delay time is short.

FIG. 13 is a drawing illustrating a RACH resource arrangement example (4) in the case where an SS block subcarrier spacing is 15 kHz according to an embodiment of the present invention. The RACH resource arrangement in a slot in which the SS blocks are arranged (the slot for which the SS block subcarrier spacing is assumed) may be indicated (transmitted), or may be defined in advance in the specification. The RACH resources may be arranged after the SS blocks have been repeated multiple times. For example, the RACH resources may be arranged together every time a pattern of SS blocks is arranged. As illustrated in FIG. 13A, the RACH resources are arranged every time two SS blocks have been arranged. Even in the case of 15 kHz SCS, it is still possible to arrange the RACH resources in a slot in which the SS blocks are arranged. Further, after the start of the RACH resources, the RACH resources may be arranged in a plurality of symbols according to the PRACH preamble format or according to the number of iterations of the RACH resources corresponding to one format. For example, in the case of 30 kHz or 60 kHz SCS, according to the expansion of the RACH #0, arrangement of the subsequent RACH #1 may be shifted in the time direction. Further, for example, in FIG. 13A, the arrangement of the RACH resources starts right after the SS blocks. The RACH resources may be arranged in line with the slot end with offsetting one symbol. In the case of the 30 kHz or 60 kHz radio frame, each of the RACH resources may be arranged by shifting towards the end of the radio frame by one or two symbols.

FIG. 13A illustrates a RACH resource arrangement in a case in which the subcarrier spacing of the radio signal via which SS blocks are transmitted is 15 kHz, the frequency band is up to 3 GHz, the time length of the PRACH preamble format is one (1) symbol, and the number of iterations of the RACH resources is one (1). SSB #0 and SSB #1 are arranged in slot #0, and SSB #2 and SSB #3 are arranged in slot #1. SSB #0 is arranged in slot #0 symbols #2 to #5, SSB #1 is arranged in symbols #8 to #11, RACH #0 is arranged in symbol #12, and RACH #1 is arranged in symbol #13. Further, in the 30 kHz SCS radio frame, as illustrated in FIG. 13A, RACH #0 may be arranged in symbol #23, and RACH #1 may be arranged in symbol #24. Further, in the 60 kHz SCS radio frame, as illustrated in FIG. 13A, RACH #0 may be arranged in symbol #45, and RACH #1 may be arranged in symbol #46. In-slot arrangement in slot #1 is the same as the in-slot arrangement in slot #0.

FIG. 13B illustrates a RACH resource arrangement in a case where the subcarrier spacing of radio signals via which SS blocks are transmitted is 15 kHz and where the frequency band is up to 3 GHz. SSB #0 and SSB #1 are arranged in slot #0, SSB #2 and SSB #3 are arranged in slot #1, SSB #4 and SSB #5 are arranged in slot #2, and SSB #6 and SSB #7 are arranged in slot #3. The in-slot arrangement is the same as in FIG. 13A.

FIG. 13C illustrates a RACH resource arrangement in a case in which the subcarrier spacing of the radio signal via which SS blocks are transmitted is 15 kHz, the frequency band is up to 3 GHz, the time length of the PRACH preamble format is one (1) symbol, and the number of iterations of the RACH resources is one (1). Different from FIG. 13A, in the 30 kHz SCS radio frame, RACH #0 may be arranged in symbol #25, and RACH #1 may be arranged in symbol #26. Further, in the 60 kHz SCS radio frame, as illustrated in FIG. 13C, RACH #0 may be arranged in symbol #51, and RACH #1 may be arranged in symbol #52.

FIG. 14 is a drawing illustrating a RACH resource arrangement example (1) in the case where an SS block subcarrier spacing is 30 kHz according to an embodiment of the present invention. In FIG. 14, the same RACH resource arrangement as in FIG. 9 or FIG. 10 in which the SS block subcarrier spacing is 15 kHz is applied to the radio frame with 30 kHz SS block subcarrier spacing. The RACH resource arrangement may be indicated (transmitted) or may be defined in advance in the specification.

FIG. 14A illustrates a SS block in-slot configuration example 1 in which SSB #0 is arranged in slot #0 symbols #4 to #7, SSB #1 is arranged in symbols #8 to #11, SSB #2 is arranged in slot #2 symbols #2 to #5, and SSB #3 is arranged in symbols #6 to #9. The 15 kHz or 60 kHz SCS radio frames may be used for transmitting and receiving data.

FIG. 14B illustrates a RACH resource arrangement in a case where the subcarrier spacing of radio signals via which SS blocks are transmitted is 15 kHz and where the frequency band is up to 3 GHz. Similar to the SS block in-slot configuration example 1 in FIG. 14A, SSBs #0 to #3 are arranged in slot #0 and slot #1. The start of the RACH resources is arranged in one of slots #2, #3, #4, and so on, and RACHs #0 to #3 are arranged continuously. By transmitting or defining a location of the start of the RACH resources, the RACH resources are arranged in the consecutive slots starting from the transmitted or defined location.

FIG. 14C illustrates a RACH resource arrangement in a case where the subcarrier spacing of radio signals via which SS blocks are transmitted is 30 kHz and where the frequency band is between 3 GHz and 6 GHz. Similar to the SS block in-slot configuration example 1 in FIG. 14A, SSBs #0 to #7 are arranged in slots #0 to #3. The start of the RACH resources is arranged in one of slots #4, #5, #7, and so on, and RACHs #0 to #7 are arranged continuously. By transmitting or defining a location of the start of the RACH resources, the RACH resources are arranged in the consecutive slots starting from the transmitted or defined location.

FIG. 14D illustrates a RACH resource arrangement in a case in which the subcarrier spacing of the radio signal via which SS blocks are transmitted is 30 kHz, the frequency band is up to 3 GHz, the time length of the PRACH preamble format is one (1) symbol, and the number of iterations of the RACH resources is one (1). Similar to the SS block in-slot configuration example 1 in FIG. 14A, SSBs #0 to #3 are arranged in slot #0 and slot #1. In the 30 kHz SCS radio frame, RACH #0 is arranged in slot #0 symbol #12, RACH #1 is arranged in symbol #13, RACH #2 is arranged in slot #1 symbol #10, and RACH #3 is arranged in symbol #11. In the 15 kHz SCS radio frame, RACH #0 may be arranged in symbol #6, RACH #1 may be arranged in symbol #7, RACH #2 may be arranged in symbol #12, and RACH #3 may be arranged in symbol #13. Here, regarding the radio frame with 60 kHz SCS, descriptions will be made by using the number of symbols from the start. In other words, symbols #0 to #51 are arranged in the radio frame with 60 kHz SCS. In the 60 kHz SCS radio frame, RACH #0 is arranged in symbol #22, RACH #1 is arranged in symbol #23, RACH #2 is arranged in symbol #44, and RACH #3 is arranged in symbol #45.

FIG. 14E illustrates a RACH resource arrangement in a case where the subcarrier spacing of radio signals via which SS blocks are transmitted is 30 kHz and where the frequency band is up to 3 GHz. Similar to the SS block in-slot configuration example 1 in FIG. 14A, SSBs #0 to #3 are arranged in slot #0 and slot #1. The RACH resources within a slot may be arranged in the same way as in FIG. 14D.

FIG. 14F illustrates a RACH resource arrangement in a case where the subcarrier spacing of radio signals via which SS blocks are transmitted is 30 kHz and where the frequency band is between 3 GHz and 6 GHz. Similar to the SS block in-slot configuration example 1 in FIG. 14A, SSBs #0 to #7 are arranged in slots #0 to #3. The RACH resources within a slot may be arranged in the same way as in FIG. 14D.

FIG. 15 is a drawing illustrating a RACH resource arrangement example (2) in the case where an SS block subcarrier spacing is 30 kHz according to an embodiment of the present invention. The RACH resource arrangement may be indicated (transmitted) or may be defined in advance in the specification.

FIG. 15A illustrates a RACH resource arrangement in a case in which the subcarrier spacing of the radio signal via which SS blocks are transmitted is 30 kHz, the frequency band is up to 3 GHz, the time length of the PRACH preamble format is one (1) symbol, and the number of iterations of the RACH resources is one (1). Similar to the SS block in-slot configuration example 1 in FIG. 14A, SSBs #0 to #3 are arranged in slot #0 and slot #1. In the 30 kHz SCS radio frame, RACH #0 is arranged in slot #1 symbol #10, RACH #1 is arranged in symbol #11, RACH #2 is arranged in symbol #12, and RACH #3 is arranged in symbol #13. The above arrangement of RACHs #0 to #3 within a slot cannot be applied to the 15 kHz SCS radio frame. Therefore, RACHs #0 to #3 are not arranged in the 15 kHz SCS radio frame in FIG. 15A, but may be arranged by using other arrangement methods. Here, regarding the radio frame with 60 kHz SCS, descriptions will be made by using the number of symbols from the start. In other words, symbols #0 to #51 are arranged in the radio frame with 60 kHz SCS. In the 60 kHz SCS radio frame, RACH #0 is arranged in symbol #44, RACH #1 is arranged in symbol #45, RACH #2 is arranged in symbol #46, and RACH #3 is arranged in symbol #47.

FIG. 15B illustrates a RACH resource arrangement in a case where the subcarrier spacing of radio signals via which SS blocks are transmitted is 30 kHz and where the frequency band is up to 3 GHz. Similar to the SS block in-slot configuration example 1 in FIG. 14A, SSBs #0 to #3 are arranged in slot #0 and slot #1. The RACH resources within a slot may be arranged in the same way as in FIG. 15A.

FIG. 15C illustrates a RACH resource arrangement in a case where the subcarrier spacing of radio signals via which SS blocks are transmitted is 30 kHz and where the frequency band is between 3 GHz and 6 GHz. Similar to the SS block in-slot configuration example 1 in FIG. 14A, SSBs #0 to #7 are arranged in slots #0 to #3. The RACH resources within a slot may be arranged in the same way as in FIG. 15A.

FIG. 15D illustrates a SS block in-slot configuration example 2 in which SSB #0 is arranged in slot #0 symbols #2 to #5, SSB #1 is arranged in symbols #8 to #11, SSB #2 is arranged in slot #1 symbols #2 to #5, and SSB #3 is arranged in symbols #8 to #11. The 15 kHz or 60 kHz SCS radio frames may be used for transmitting and receiving data. Further, FIG. 15D illustrates a RACH resource arrangement in a case in which the subcarrier spacing of the radio signal via which SS blocks are transmitted is 30 kHz, the frequency band is up to 3 GHz, the time length of the PRACH preamble format is one (1) symbol, and the number of iterations of the RACH resources is one (1). In the 30 kHz SCS radio frame, RACH #0 is arranged in slot #0 symbol #7, RACH #1 is arranged in symbol #13, RACH #2 is arranged in slot #1 symbol #7, and RACH #3 is arranged in symbol #13.

FIG. 15E illustrates a RACH resource arrangement in a case where the subcarrier spacing of radio signals via which SS blocks are transmitted is 30 kHz and where the frequency band is up to 3 GHz. Similar to the SS block in-slot configuration example 1 in FIG. 14A, SSBs #0 to #3 are arranged in slot #0 and slot #1. The RACH resources within a slot may be arranged in the same way as in FIG. 15D.

FIG. 15F illustrates a RACH resource arrangement in a case where the subcarrier spacing of radio signals via which SS blocks are transmitted is 30 kHz and where the frequency band is between 3 GHz and 6 GHz. Similar to the SS block in-slot configuration example 1 in FIG. 14A, SSBs #0 to #7 are arranged in slots #0 to #3. The RACH resources within a slot may be arranged in the same way as in FIG. 15D.

FIG. 16 is a drawing illustrating a RACH resource arrangement example (3) in the case where an SS block subcarrier spacing is 30 kHz according to an embodiment of the present invention. The RACH resource arrangement may be indicated (transmitted) or may be defined in advance in the specification.

In FIG. 16A, as a SS block in-slot configuration example 2 in FIG. 15D, SSB #0 is arranged in slot #0 symbols #2 to #5, SSB #1 is arranged in symbols #8 to #11, SSB #2 is arranged in slot #1 symbols #2 to #5, and SSB #3 is arranged in symbols #8 to #11. The 15 kHz or 60 kHz SCS radio frames may be used for transmitting and receiving data. Further, FIG. 16A illustrates a RACH resource arrangement in a case in which the subcarrier spacing of the radio signal via which SS blocks are transmitted is 30 kHz, the frequency band is up to 3 GHz, the time length of the PRACH preamble format is one (1) symbol, and the number of iterations of the RACH resources is one (1). In the 30 kHz SCS radio frame, RACH #0 is arranged in slot #0 symbol #12, RACH #1 is arranged in symbol #13, RACH #2 is arranged in slot #1 symbol #12, and RACH #3 is arranged in symbol #13. The above arrangement of RACHs #0 to #3 cannot be applied to the 15 kHz SCS radio frame. Therefore, RACHs #0 to #3 are not arranged in the 15 kHz SCS radio frame in FIG. 16A, but may be arranged by using other arrangement methods.

FIG. 16B illustrates a RACH resource arrangement in a case where the subcarrier spacing of radio signals via which SS blocks are transmitted is 30 kHz and where the frequency band is up to 3 GHz. Similar to the SS block in-slot configuration example 2 in FIG. 15D, SSBs #0 to #3 are arranged in slot #0 and slot #1. The RACH resources within a slot may be arranged in the same way as in FIG. 16A.

FIG. 16C illustrates a RACH resource arrangement in a case where the subcarrier spacing of radio signals via which SS blocks are transmitted is 30 kHz and where the frequency band is between 3 GHz and 6 GHz. Similar to the SS block in-slot configuration example 2 in FIG. 15D, SSBs #0 to #7 are arranged in slots #0 to #3. The RACH resources within a slot may be arranged in the same way as in FIG. 16A.

FIG. 17 is a drawing illustrating a RACH resource arrangement example (1) in the case where an SS block subcarrier spacing is 120 kHz according to an embodiment of the present invention. The RACH resource arrangement may be indicated (transmitted) or may be defined in advance in the specification. Compared with a case of SS block subcarrier spacing 15 kHz or 30 kHz, there is a difference in that there are slot gaps within the SS burst set. The RACH resources may be arranged or may not be arranged in the slot gaps. The RACH resource arrangement may be indicated (transmitted) or may be defined in advance in the specification.

FIG. 17A illustrates an in-slot configuration in slots #20 and #21 in a case where the subcarrier spacing of radio signals via which SS blocks are transmitted is 120 kHz and where the frequency band is between 6 GHz and 52.6 GHz. In the 120 kHz SCS radio frame, SSB #32 is arranged in slot #20 symbols #4 to #7, SSB #33 is arranged in symbols #8 to #11, SSB #34 is arranged in slot #21 symbols #2 to #5, and SSB #35 is arranged in symbols #6 to #9. The RACH resources may be arranged in units of slot. The RACH resources may be arranged in the slot gaps within the SS burst set as described above. In other words, the RACH resources may be arranged in slot #8, slot #9, slot #18, slot #19, slot #28, slot #29, slot #38, and slot #39 in FIG. 17A in which SS blocks are not arranged.

FIG. 17B illustrates an in-slot configuration in slots #20 and #21 in a case where the subcarrier spacing of radio signals via which SS blocks are transmitted is 120 kHz and where the frequency band is between 6 GHz and 52.6 GHz. Similar to FIG. 17A, in the 120 kHz SCS radio frame, SSB #32 is arranged in slot #20 symbols #4 to #7, SSB #33 is arranged in symbols #8 to #11, SSB #34 is arranged in slot #21 symbols #2 to #5, and SSB #35 is arranged in symbols #8 to #11. Regarding the RACH resources, in the 120 kHz SCS radio frame, RACH #32 is arranged in slot #20 symbol #12, RACH #33 is arranged in symbol #13, RACH #34 is arranged in slot #21 symbol #10, and RACH #35 is arranged in symbol #11. In the 60 kHz SCS radio frame, RACH #32 is arranged in symbol #6, RACH #33 is arranged in symbol #7, RACH #34 is arranged in symbol #12, and RACH #35 is arranged in symbol #13. The RACH resources are arranged in the same manner in other slots in which SS blocks are arranged.

FIG. 18 is a drawing illustrating a RACH resource arrangement example (2) in the case where an SS block subcarrier spacing is 120 kHz according to an embodiment of the present invention. The RACH resource arrangement may be indicated (transmitted) or may be defined in advance in the specification.

FIG. 18A illustrates an in-slot configuration in slots #20 and #21 in a case where the subcarrier spacing of radio signals via which SS blocks are transmitted is 120 kHz and where the frequency band is between 6 GHz and 52.6 GHz. Similar to FIG. 17A, in the 120 kHz SCS radio frame, SSB #32 is arranged in slot #20 symbols #4 to #7, SSB #33 is arranged in symbols #8 to #11, SSB #34 is arranged in slot #21 symbols #2 to #5, and SSB #35 is arranged in symbols #6 to #9. Regarding the RACH resources, in the 120 kHz SCS radio frame, RACH #32 is arranged in slot #21 symbol #10, RACH #33 is arranged in symbol #11, RACH #34 is arranged in symbol #12, and RACH #35 is arranged in symbol #13. The above arrangement of RACHs #32 to #35 cannot be applied to the 60 kHz SCS radio frame. Therefore, RACHs #32 to #35 are not arranged in the 60 kHz SCS radio frame in FIG. 18A, but may be arranged by using other arrangement methods.

Here, in the case of SS block subcarrier spacing 120 kHz or 240 kHz, it is considered that the RACH resources are arranged by using the slot gaps within the SS burst set. As illustrated in FIG. 18B, the RACH resources may be arranged in a slot of the gap slots and in the end of a slot right before the slot of the gap slots. For example, in the case of repeating-two-symbol RACH resources, two gap slots and the last four symbols of a slot right before the gap slots may be used. Further, the starting two symbols in the gap slots may be reserved symbols.

FIG. 18B illustrates an in-slot configuration in slots #6 and #7 in a case where the subcarrier spacing of radio signals via which SS blocks are transmitted is 120 kHz and where the frequency band is between 6 GHz and 52.6 GHz. In the 120 kHz SCS radio frame, SSB #12 is arranged in slot #6 symbols #4 to #7, SSB #13 is arranged in symbols #8 to #11, SSB #14 is arranged in slot #7 symbols #2 to #5, and SSB #15 is arranged in symbols #6 to #9. Regarding the RACH resources, RACH #0 is arranged in slot #7 symbol #12, and RACH #1 is arranged in symbol #13. RACH #2 is arranged in the subsequent slot #8 symbol #0, and RACHs #3 to #15 are arranged in symbols #1 to #13. The RACH resources are arranged also in slots #17 and #18, in slots #27 and #28, in slots #37 and #38, in the same manner as in slots #7 and #8. By arranging the RACH resources as illustrated in FIG. 18B, in the radio frame, arrangement of the subsequent SS blocks is started after the arrangement of the RACH resources corresponding to a predetermined number of SS blocks is completed.

FIG. 19 is a drawing illustrating a RACH resource arrangement example in the case where an SS block subcarrier spacing is 240 kHz according to an embodiment of the present invention. The RACH resource arrangement may be indicated (transmitted) or may be defined in advance in the specification. It should be noted that, as described above, RMSI, data, or PRACH is not arranged in the 240 kHz SCS radio frame. Only SS blocks are arranged in the 240 kHz SCS radio frame.

FIG. 19A illustrates an in-slot configuration in slots #32 to #35 in a case where the subcarrier spacing of radio signals via which SS blocks are transmitted is 240 kHz and where the frequency band is between 6 GHz and 52.6 GHz. In the 240 kHz SCS radio frame, SSB #56 is arranged in slot #32 symbols #8 to #11, SSB #57 is arranged in slot #52 symbol #12 to slot #33 symbol #1, SSB #58 is arranged in symbols #2 to #5, and SSB #59 is arranged in symbols #6 to #9. SSB #60 is arranged in slot #34 from symbols #4 to #7, SSB #61 is arranged in symbols #8 to #11, SSB #62 is arranged in slot #34 symbol #12 to slot #35 symbol #1, and SSB #63 is arranged in symbols #2 to #5. The RACH resources may be arranged on a slot unit basis. The RACH resources may be arranged in the slot gaps within the SS burst set as described above. In other words, the RACH resources may be arranged in slots #16 to #19 in FIG. 19A in which SS blocks are not arranged.

FIG. 19B illustrates an in-slot configuration in slots #32 to #35 in a case where the subcarrier spacing of radio signals via which SS blocks are transmitted is 240 kHz and where the frequency band is between 6 GHz and 52.6 GHz. In the 240 kHz SCS radio frame, similar to FIG. 19A, SSB #56 is arranged in slot #32 symbols #8 to #11, SSB #57 is arranged in slot #32 symbol #12 to slot #33 symbol #1, SSB #58 is arranged in symbols #2 to #5, and SSB #59 is arranged in symbols #6 to #9. SSB #60 is arranged in slot #34 from symbols #4 to #7, SSB #61 is arranged in symbols #8 to #11, SSB #62 is arranged in slot #34 symbol #12 to slot #35 symbol #1, and SSB #63 is arranged in symbols #2 to #5. The RACH resources may be arranged in the 120 kHz SCS radio frame as illustrated in FIG. 19B. In the 120 kHz SCS radio frame, RACH #56 is arranged in slot #16 symbol #12, RACH #57 is arranged in symbol #13, RACH #58 is arranged in slot #17 symbol #0, RACH #59 is arranged in symbol 1, RACH #60 is arranged in symbol #10, RACH #61 is arranged in symbol #11, RACH #62 is arranged in symbol

12, and RACH #63 is arranged in symbol #13. However, there may be a possibility of trouble in the scheduling of downlink control information because the RACH resources are arranged in the start of a slot. Therefore, other RACH resource arrangements may be adopted.

FIG. 19C illustrates an in-slot configuration in slots #12 to #15 in a case where the subcarrier spacing of radio signals via which SS blocks are transmitted is 240 kHz and where the frequency band is between 6 GHz and 52.6 GHz. In the 240 kHz SCS radio frame, SSB #24 is arranged in slot #12 symbols #8 to #11, SSB #25 is arranged in slot #12 symbol #12 to slot #13 symbol #1, SSB #26 is arranged in symbols #2 to #5, and SSB #27 is arranged in symbols #6 to #9. SSB #28 is arranged in slot #14 from symbols #4 to #7, SSB #29 is arranged in symbols #8 to #11, SSB #30 is arranged in slot #14 symbol #12 to slot #15 symbol #1, and SSB #31 is arranged in symbols #2 to #5. Regarding the RACH resources, in the 120 kHz SCS radio frame, RACH #0 is arranged in slot #7 symbol #10, RACH #1 is arranged in symbol #11, RACH #2 is arranged in symbol #12, and RACH #3 is arranged in symbol #13. RACH #4 is arranged in the subsequent slot #8 symbol #0, and RACHs #5 to #31 are arranged in slot #8 symbol #1 to slot #9 symbol #13. By arranging the RACH resources as illustrated in FIG. 19C, in the radio frame, arrangement of the subsequent SS blocks is started after the arrangement of the RACH resources corresponding to a predetermined number of SS blocks is completed.

In an embodiment described above, the base station apparatus 100 arranges RACH resources to be used for initial access in the radio frame according to the locations in which the SS blocks are transmitted, or according to the subcarrier spacing of the radio signal in which the SS blocks, RMSI, or data is transmitted, or according to the time length of the preamble, and the user apparatus 200 performs the initial access using the RACH resources. In other words, in an initial access of a wireless communication system, it is possible to appropriately arrange resources, that are used for random access, in the radio frame.

(Apparatus Structure)

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 20:
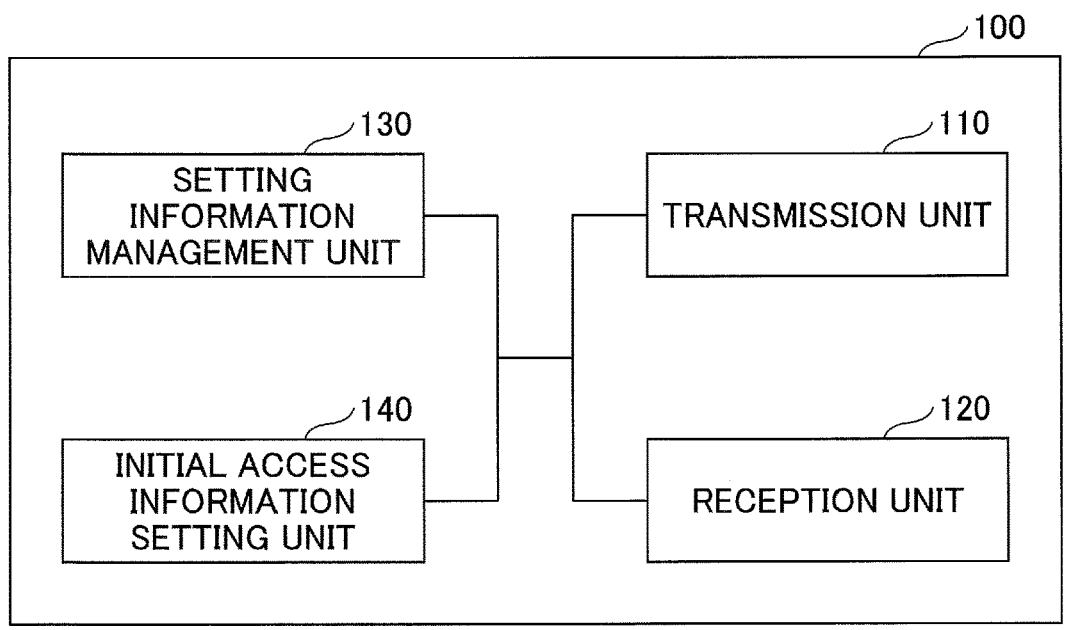
FIG. 20 is drawing illustrating an example of a functional structure of a base station apparatus 100 according to an embodiment of the present invention.

FIG. 20 is a drawing illustrating an example of a functional structure of a base station apparatus 100. As illustrated in FIG. 20, the base station apparatus 100 includes a transmission unit 110, a reception unit 120, a setting information management unit 130, and an initial access information setting unit 140. The functional structure illustrated in FIG. 20 is merely an example. Functional divisions and names of functional units may be anything as long as operations can be performed according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting to the user apparatus 200 NR-PSS, NR-SSS, NR-PBCH, DL/UL control signals, etc. Further, the transmission unit 110 transmits to the user apparatus 200 information related to transmission power control and information related to scheduling, and the reception unit 120 receives from the user apparatus 200 a message related to a preamble and initial access.

The setting information management unit 130 stores preset setting information and various setting information items to be transmitted to the user apparatus 200. Contents of the setting information are, for example, information to be used for initial access, etc.

The initial access information setting unit 140 controls transmission of a synchronization signal from the base station apparatus 100 to the user apparatus 200 and transmission of information used for initial access. The initial access information setting unit 140 also controls initial access from the user apparatus 200.

Figure 21:
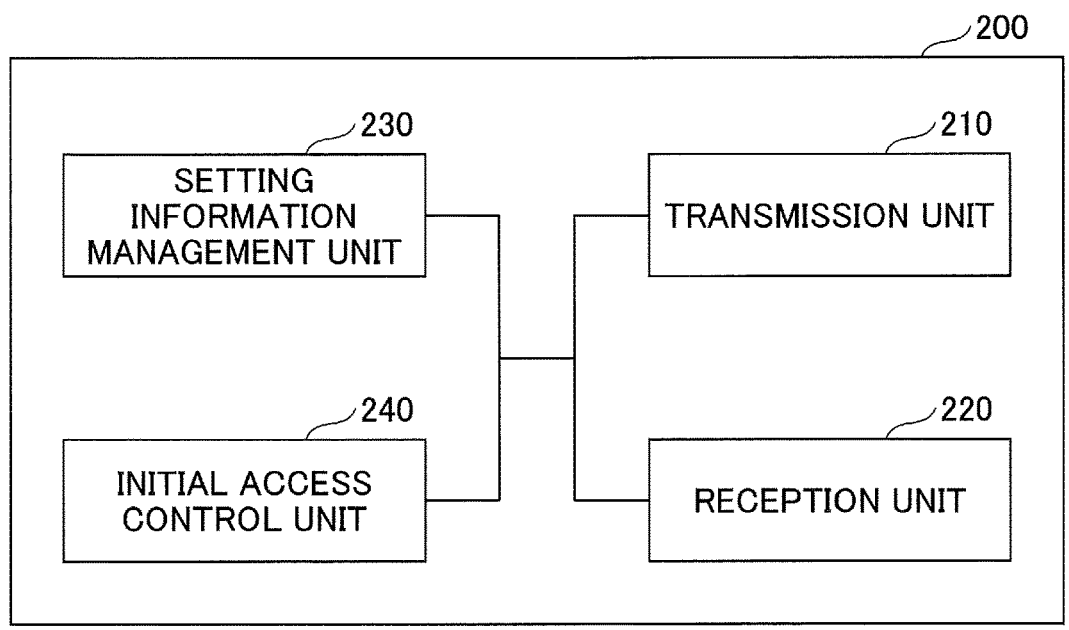
FIG. 21 is drawing illustrating an example of a functional structure of a user apparatus 200 according to an embodiment of the present invention.

FIG. 21 is a drawing illustrating an example of a functional structure of a user apparatus 200. As illustrated in FIG. 21, the user apparatus 200 includes a transmission unit 210, a reception unit 220, a setting information management unit 230, and an initial access control unit 240. The functional structure illustrated in FIG. 21 is merely an example. Functional divisions and names of functional units may be anything as long as operations can be performed according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, the transmission unit 210 transmits to the base station apparatus 100 a message related to a preamble and initial access, and the reception unit 220 receives from the base station apparatus 100 information to be used for initial access.

The setting information management unit 230 stores various setting information items received by the reception unit 220 from the base station apparatus 100. Further, the setting information management unit 230 also stores preset setting information. Contents of the setting information are, for example, information to be used for initial access, etc.

The initial access control unit 240 controls initial access of the user apparatus 200 described in an embodiment of the present invention. It should be noted that the functional units related to preamble signal transmission, etc., in the initial access control unit 240 may be included in the transmission unit 210, and the functional units related to system information reception, etc., in the initial access control unit 240 may be included in the reception unit 220.

(Hardware Structure)

In the above functional structure diagrams used for describing an embodiment of the present invention (FIG. 20 and FIG. 21), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 22:
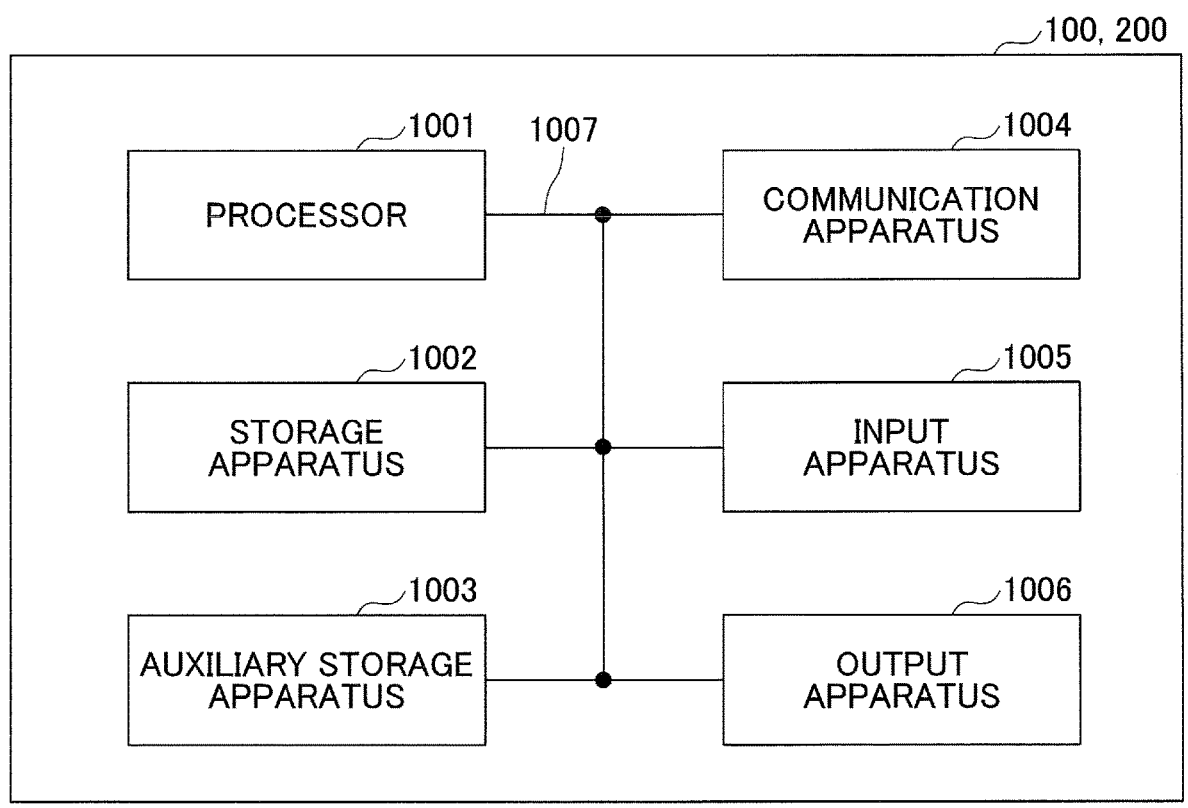
FIG. 22 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 22 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the initial access information setting unit 140 of the base station apparatus 100 illustrated in FIG. 20 may be realized by control programs that are stored in the storage apparatus 1002 and are executed by the processor 1001. Further, for example, the transmission unit 210, the reception unit 220, the setting information management unit 230, and the initial access control unit 240 of the user apparatus 200 illustrated in FIG. 21 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a base station apparatus that communicates with a user apparatus is provided. The base station apparatus includes: a setting unit configured to arrange in a radio frame one or more blocks including information to be used for initial access and information specifying a resource, that is associated with the blocks, used for transmitting a preamble; a transmission unit configured to transmit the radio frame to the user apparatus; and a reception unit configured to receive the preamble from the user apparatus via the resource. The information specifying the resource is set based on the locations of the blocks arranged in the radio frame.

According to the above, in initial access of a wireless communication system, it is possible to appropriately arrange a resource, that is used for random access, in a radio frame.

The information specifying the resources may be set based on the blocks, on information that is not included in the blocks and is necessary for the initial access, or on a subcarrier spacing of the radio frame in which data of the communications is arranged. According to the above, it is possible for the base station apparatus to arrange the RACH resources according to the subcarrier spacing of the radio frame.

The information specifying the resources may include arrangement of a reserved symbol in which the resources are not arranged. According to the above, it is possible to control transmission chances of control signals by specifying symbols in which the RACH resources are not arranged.

The information specifying the resources may include one or more of first formats in which the resources are arranged in slots that include the blocks, and may include one or more of second formats in which the resources are arranged in slots that do not include the blocks. According to the above, it is possible to arrange the RACH resources in a slot in which the SS blocks are included.

The information specifying the resources may include: a start location of the slots in which the resources are arranged, and an offset from the blocks; and information indicating that the resources are arranged in a continuous manner or information indicating that the resources are arranged in a non-continuous manner. According to the above, it is possible to efficiently transmit an indication of arrangement method to the user apparatus according to whether the RACH resources are arranged in a continuous manner or the RACH resources are arranged in a non-continuous manner.

The information specifying the resources includes a part or all of information of: a start location of slots in which the resources are arranged; a gap between a slot in which the resources are arranged and the subsequent slot; a preamble format; the number of iterations of the resources; a cycle of a repeated set of the resources; a gap of the repeated sets of the resources; a pattern of the repeated sets of the resources; arrangement of a reserved symbol in which the resources are not arranged, and, according to the part or all of the information, the resources associated with the blocks are implicitly specified. According to the above, it is possible to implicitly specify the RACH resources based on a part or all of information of: a start location of slots in which the resources are arranged; a gap between a slot in which the resources are arranged and the subsequent slot; a preamble format; the number of iterations of the resources; a cycle of a repeated sets of the resources; a gap of the repeated sets of the resources; a pattern of the repeated sets of the resources; arrangement of a reserved symbol in which the resources are not arranged, and thus, it is possible to reduce the overhead related to transmissions (indications) (notifications). Further, it is possible to provide an appropriate arrangement according to various requirements such as permitted delay, etc.

The information specifying the resources may indicate that, in the radio frame, the resources are arranged in candidate locations for the blocks arrangement. According to the above, in the case where the SS blocks are not transmitted in an arrangement candidate location for the SS blocks in actuality, it is possible to arrange the RACH resources in the location.

The information specifying the resources may indicate that, in the radio frame, the resources are arranged between a first block and a second block, and the resources are arranged by providing a predetermined gap period from a location in which the first block is arranged. According to the above, it becomes possible to arrange the RACH resources in the gap between the SS blocks, and it is possible for the user apparatus to have time required for processing preamble transmission, etc., by having the SS blocks arranged with the predetermined gap period.

The information specifying the resources may indicate that, in the radio frame, after one or more of the resources corresponding to all of the predetermined number of arranged blocks are arranged, arrangement of blocks different from the predetermined number of blocks is started. According to the above, in the radio frame, by having the arrangement of the subsequent SS blocks started after the arrangement of the RACH resources corresponding to the predetermined number of SS blocks is completed, it is possible to provide a radio frame in which association between the SS blocks and the RACH resources is completed at a predetermined time.

A user apparatus that communicates with a base station apparatus is provided. The user apparatus includes a reception unit configured to receive a radio frame from the base station apparatus; a control unit configured to obtain one or more blocks including information used for initial access and information specifying resources, that are associated with the blocks, used for transmitting a preamble, and to identify the resources and the preamble to be used based on the information used for the initial access and the information specifying the resources; and a transmission unit configured to transmit the preamble to the base station apparatus. The information specifying the resources is set based on the locations of the blocks arranged in the radio frame.

According to the above, in the initial access of a wireless communication system, it is possible for the user apparatus to perform the initial access in the radio frame in which the resources used for the random access are appropriately arranged.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The matters that have been described in two or more items may be used in a combination if necessary, and the matter that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Aspects and embodiments described in the present specification may be applied to a system in which LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802. 16 (WiMAX), IEEE 802. 20, UWB (Ultra-WideBand), Bluetooth (registered trademark), or other appropriate systems are used, or may be applied to a next generation system enhanced based on the above systems.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the arte, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that the SS blocks are examples of the blocks in an embodiment of the present invention. The RACH resources are examples of the resources. The initial access information setting unit 140 is an example of a setting unit. RMSI is an example of information, that is not included in the blocks, required for initial access. The initial access control unit 240 is an example of a control unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

DESCRIPTION OF THE REFERENCE NUMERALS

100 Base station apparatus
200 User apparatus
110 Transmission unit
120 Reception unit
130 Setting information management unit
140 Initial access information setting unit
200 User apparatus
210 Transmission unit
220 Reception unit
230 Setting information management unit
240 Initial access control unit
1001 Processor
1002 Storage apparatus
1003 Auxiliary storage apparatus
1004 Communication apparatus 1005 Input apparatus
1006 Output apparatus

What is claimed is:

1. A terminal comprising:
a receiver configured to receive configuration information for identifying a RACH (Random Access Channel) resource from a base station apparatus;
a processor configured to identify a slot for transmitting a random access preamble based on the configuration information; and
a transmitter configured to transmit the random access preamble to the base station apparatus via a RACH resource arranged in the slot,
wherein the processor identifies the RACH resource based on a number of consecutively arranged RACH resources associated with one synchronization signal (SS) block, the number being indicated by the configuration information.

2. The terminal according to claim 1, wherein the processor is configured to identify the RACH resource based on at least one of
a format of the random access preamble indicated by the configuration information,
a time length of the random access preamble,
a position of a slot in which the RACH resource is arranged, and
a position of a symbol at which the RACH resource is arranged in the slot.

3. The terminal according to claim 2, wherein the processor is configured to identify the RACH resource based on a symbol that is arranged in a start of the slot and is not used as the RACH resource indicated by the configuration information.

4. The terminal according to claim 2, wherein the configuration information indicates a symbol that is arranged in an end of the slot and is not used as the RACH resource.

5. The terminal according to claim 2, wherein the processor is configured to identify the RACH resource based on consecutive symbols for the RACH resource in the slot which are indicated by the configuration information.

6. The terminal according to claim 2, wherein a time length of the slot is derived from a subcarrier spacing that is same as a determined carrier spacing.

7. The terminal according to claim 2, wherein the processor is configured to identify the RACH resource arranged in the slot by assuming that a subcarrier spacing is 15 kHz in case of a subcarrier spacing of the random access preamble being 1.25 kHz or 5 kHz.

8. The terminal according to claim 1, wherein the processor is configured to identify the RACH resource based on a symbol that is arranged in a start of the slot and is not used as the RACH resource indicated by the configuration information.

9. The terminal according to claim 8, wherein the configuration information indicates a symbol that is arranged in an end of the slot and is not used as the RACH resource.

10. The terminal according to claim 8, wherein the processor is configured to identify the RACH resource based on consecutive symbols for the RACH resource in the slot which are indicated by the configuration information.

11. The terminal according to claim 8, wherein a time length of the slot is derived from a subcarrier spacing that is same as a determined carrier spacing.

12. The terminal according to claim 1, wherein the configuration information indicates a symbol that is arranged in an end of the slot and is not used as the RACH resource.

13. The terminal according to claim 12, wherein the processor is configured to identify the RACH resource based on consecutive symbols for the RACH resource in the slot which are indicated by the configuration information.

14. The terminal according to claim 12, wherein a time length of the slot is derived from a subcarrier spacing that is same as a determined carrier spacing.

15. The terminal according to claim 1, wherein the processor is configured to identify the RACH resource based on consecutive symbols for the RACH resource in the slot which are indicated by the configuration information.

16. The terminal according to claim 15, wherein a time length of the slot is derived from a subcarrier spacing that is same as a determined carrier spacing.

17. The terminal according to claim 1, wherein a time length of the slot is derived from a subcarrier spacing that is same as a determined carrier spacing.

18. The terminal according to claim 1, wherein the processor is configured to identify the RACH resource arranged in the slot by assuming that a subcarrier spacing is 15 kHz in case of a subcarrier spacing of the random access preamble being 1.25 kHz or 5 kHz.

19. A communication method of a terminal, the communication method comprising:
receiving configuration information for identifying a RACH (Random Access Channel) resource from a base station apparatus;
identifying a slot for transmitting a random access preamble based on the configuration information; and
transmitting the random access preamble to the base station apparatus via a RACH resource arranged in the slot,
wherein the identifying includes identifying the RACH resource based on a number of consecutively arranged RACH resources associated with one synchronization signal (SS) block, the number being indicated by the configuration information.

20. A base station apparatus comprising:
a processor configured to determine a RACH (Random Access Channel) resource;
a transmitter configured to transmit configuration information for identifying the RACH resource to a terminal; and
a receiver configured to receive a random access preamble from the terminal via a RACH resource arranged in a slot indicated by the configuration information,
wherein the processor identifies the RACH resource based on a number of consecutively arranged RACH resources associated with one synchronization signal (SS) block, the number being indicated by the configuration information.

* * * * *